(12) United States Patent
Kaspa

(10) Patent No.: US 11,763,178 B2
(45) Date of Patent: Sep. 19, 2023

(54) PREDICTIVE SCHEDULING AND EXECUTION OF DATA ANALYTICS APPLICATIONS BASED ON MACHINE LEARNING TECHNIQUES

(71) Applicant: Capital One Services, LLC, McLean, VA (US)

(72) Inventor: Chanakya Kaspa, Mckinney, TX (US)

(73) Assignee: Capital One Services, LLC, McLean, VA (US)

(*) Notice: Subject to any disclaimer, the term of this patent is extended or adjusted under 35 U.S.C. 154(b) by 368 days.

(21) Appl. No.: 16/887,742

(22) Filed: May 29, 2020

(65) Prior Publication Data

US 2021/0374564 A1    Dec. 2, 2021

(51) Int. Cl.
| | | |
|---|---|---|
| *G06N 20/00* | (2019.01) | |
| *G06N 5/04* | (2023.01) | |
| *G06Q 10/0631* | (2023.01) | |
| *G06F 16/25* | (2019.01) | |
| *G06F 9/455* | (2018.01) | |
| *G06F 9/48* | (2006.01) | |

(52) U.S. Cl.
CPC ........... *G06N 5/04* (2013.01); *G06F 9/45558* (2013.01); *G06F 9/4881* (2013.01); *G06F 16/254* (2019.01); *G06N 20/00* (2019.01); *G06Q 10/06315* (2013.01); *G06Q 10/06316* (2013.01); *G06F 2009/45583* (2013.01)

(58) Field of Classification Search
CPC . G06N 5/04; G06N 20/00; G06N 3/08; G06F 16/254; G06F 9/45558; G06F 9/4881; G06F 2009/45583; G06Q 10/06315; G06Q 10/06316; H04L 63/1425

USPC .......................................................... 706/12
See application file for complete search history.

(56) References Cited

U.S. PATENT DOCUMENTS

| | | | |
|---|---|---|---|
| 7,058,615 B2 | 6/2006 | Yao | |
| 9,471,382 B2 | 10/2016 | Frankhauser et al. | |
| 9,529,863 B1 | 12/2016 | Gindin et al. | |
| 10,324,947 B2 | 6/2019 | Dey et al. | |
| 2017/0006135 A1* | 1/2017 | Siebel | G06N 20/00 |
| 2017/0024446 A1* | 1/2017 | O'Kane | G06F 16/2282 |
| 2017/0102693 A1* | 4/2017 | Kidd | G05B 19/41865 |
| 2017/0124487 A1* | 5/2017 | Szeto | G06F 11/1448 |
| 2019/0266496 A1 | 8/2019 | Florissi et al. | |
| 2019/0347282 A1* | 11/2019 | Cai | G06K 9/6215 |
| 2021/0004912 A1* | 1/2021 | Stark | G06Q 20/40 |

(Continued)

*Primary Examiner* — Kenneth Tang
(74) *Attorney, Agent, or Firm* — Sterne, Kessler, Goldstein & Fox P.L.L.C.

(57) ABSTRACT

Disclosed herein are system, apparatus, article of manufacture, method, and/or computer program product embodiments for predictive scheduling and execution of data analytics applications based on machine learning techniques. An apparatus may operate by determining a first prediction entry in a predicted execution schedule based at least on a current timestamp. The apparatus may also operate by determining that a first confidence score of the first prediction entry is greater than or equal to a confidence score threshold and determining that an execution prediction of the first prediction entry is greater than or equal to an execution threshold. The apparatus may further operate by transmitting a first data analytics application execution request configured to request a first instance of execution of the data analytics application.

17 Claims, 13 Drawing Sheets

(56) References Cited

U.S. PATENT DOCUMENTS

2021/0303381 A1* 9/2021 Baldassarre ........ G06F 11/0751
2021/0319349 A1* 10/2021 Srivastava .............. H04L 67/62
2021/0406733 A1* 12/2021 Dubey ................... G06N 3/084

* cited by examiner

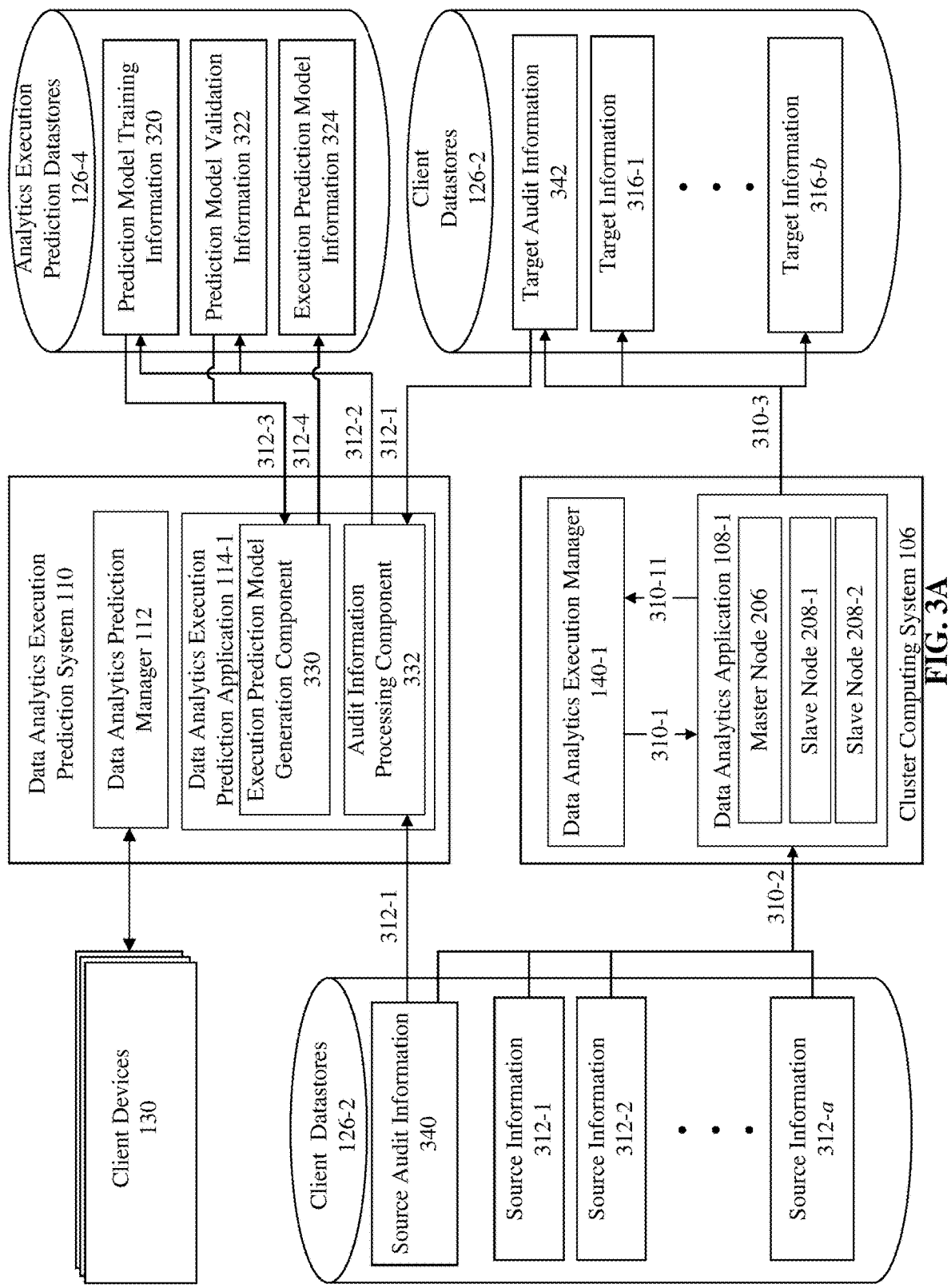

Audit Information 352

| Entry | Source Information | Target Information | Starting Timestamp | Ending Timestamp | Operations |
|---|---|---|---|---|---|
| 1 | Source Information 312-1 Identifier<br>Source Information 312-2 Identifier | Target Information 316-1 Identifier | 12-2-2019 at 8 EST | 12-2-2019 at 8:30 EST | 125 |
| 2 | Source information 312-1 Identifier<br>Source Information 312-4 Identifier<br>Source Information 312-5 Identifier | Target Information 316-2 Identifier | 12-2-2019 at 8:15 EST | 12-2-2019 at 8:45 EST | 300 |
| 3 | Source information 312-1 Identifier<br>Source Information 312-4 Identifier<br>Source Information 312-5 Identifier | Target Information 316-2 Identifier | 12-2-2019 at 9 EST | 12-2-2019 at 9:10 EST | 0 |
| 4 | Source Information 312-1 Identifier<br>Source Information 312-2 Identifier | Target Information 316-1 Identifier | 12-2-2019 at 10 EST | 12-2-2019 at 10:30 EST | 175 |
| 5 | Source Information 312-1 Identifier<br>Source Information 312-2 Identifier | Target Information 316-1 Identifier | 12-2-2019 at 11 EST | 12-2-2019 at 11:30 EST | 75 |
| 6 | Source Information 312-1 Identifier<br>Source Information 312-2 Identifier | Target Information 316-1 Identifier | 12-2-2019 at 14 EST | 12-2-2019 at 14:15 EST | 25 |
| ... | ... | ... | ... | ... | ... |
| 100 | Source Information 312-1 Identifier<br>Source Information 312-2 Identifier | Target Information 316-1 Identifier | 12-9-2019 at 8 EST | 12-9-2019 at 8:10 EST | 0 |

FIG. 3B

Predicted Model Training Information 320-1

| Information | Ending Year | Ending Month | Ending Month Day | Ending Week Day | Ending Hour | Operations | Classification |
|---|---|---|---|---|---|---|---|
| Target Information 316-1 Identifier | 2019 | 12 | 2 | 1 (Monday) | 1 | 0 | 0 |
| Target Information 316-1 Identifier | 2019 | 12 | 2 | 1 (Monday) | 2 | 0 | 0 |
| Target Information 316-1 Identifier | 2019 | 12 | 2 | 1 (Monday) | 3 | 0 | 0 |
| ... | ... | ... | ... | ... | ... | ... | ... |
| Target Information 316-1 Identifier | 2019 | 12 | 2 | 1 (Monday) | 8 | 0 | 0 |
| Target Information 316-1 Identifier | 2019 | 12 | 2 | 1 (Monday) | 9 | 125 | 1 |
| Target Information 316-1 Identifier | 2019 | 12 | 2 | 1 (Monday) | 10 | 0 | 0 |
| Target Information 316-1 Identifier | 2019 | 12 | 2 | 1 (Monday) | 11 | 175 | 1 |
| Target Information 316-1 Identifier | 2019 | 12 | 2 | 1 (Monday) | 12 | 75 | 1 |
| Target Information 316-1 Identifier | 2019 | 12 | 2 | 1 (Monday) | 13 | 0 | 0 |
| ... | ... | ... | ... | ... | ... | ... | ... |
| Target Information 316-1 Identifier | 2019 | 12 | 9 | 1 (Monday) | 9 | 0 | 0 |

| Information | Hour | Confidence Score | Execution | Default Execution | Execution Feedback | Operations Feedback |
|---|---|---|---|---|---|---|
| Target Information 316-1 Identifier | 1 | 95 | 0 | 0 | undefined | undefined |
| Target Information 316-1 Identifier | 2 | 92 | 0 | 0 | undefined | undefined |
| Target Information 316-1 Identifier | 3 | 98 | 0 | 0 | undefined | undefined |
| ... | ... | ... | ... | ... | ... | ... |
| Target Information 316-1 Identifier | 8 | 62 | 0 | 0 | undefined | undefined |
| Target Information 316-1 Identifier | 9 | 95 | 1 | 0 | 0 | 0 |
| Target Information 316-1 Identifier | 10 | 92 | 1 | 1 | undefined | undefined |
| Target Information 316-1 Identifier | 12 | 55 | 1 | 0 | undefined | undefined |
| Target Information 316-1 Identifier | 13 | 68 | 0 | 1 | 1 | 200 |

Predicted Execution Schedule 410-1

FIG. 4B

PREDICTIVE SCHEDULING AND EXECUTION OF DATA ANALYTICS APPLICATIONS BASED ON MACHINE LEARNING TECHNIQUES

BACKGROUND

Field

This disclosure is generally directed to the predictive scheduling and execution of data analytics applications based on machine learning techniques.

Background

The transition of the traditional physical infrastructure to cloud based services providers has drastically increased reliance on service-oriented architectures. This reliance is not without limits as the availability of computing resources even in the largest cloud computing services providers may become limited during peak demands. The availability of the computing resources may be further limited when computing resources are constantly required throughout a day in order to process substantial volume of data that may be added, removed, or otherwise modified. Accordingly, to improve efficiency of computing resource utilization and increase availability of computing sources, new solutions are needed to predict when meaningful data are added, removed, or otherwise modified, so that the computing resources may be efficiently used throughout a day and not wasted.

BRIEF SUMMARY

Provided herein are system, apparatus, article of manufacture, method and/or computer program product embodiments, and/or combinations and sub-combinations thereof, for predictive scheduling and execution of data analytics applications based on machine learning techniques.

An embodiment includes a server device that includes at least one processor and memory coupled to the at least one processor configured to perform predictive scheduling and execution of data analytics applications based on machine learning techniques. The at least one processor may be configured to determine a first prediction entry in a predicted execution schedule based at least on a current timestamp. The at least one processor may also be configured to determine that a first confidence score of the first prediction entry is greater than or equal to a confidence score threshold and determine that an execution prediction of the first prediction entry is greater than or equal to an execution threshold. The at least one processor may be further configured to transmit a first data analytics application execution request configured to request a first instance of execution of the data analytics application.

Another embodiment includes a computer-implemented method for predictive scheduling and execution of data analytics applications based on machine learning techniques. The method may operate by determining a first prediction entry in a predicted execution schedule based at least on a current timestamp. The method may also operate by determining that a first confidence score of the first prediction entry is greater than or equal to a confidence score threshold and determining that an execution prediction of the first prediction entry is greater than or equal to an execution threshold. The method may further operate by transmitting a first data analytics application execution request configured to request a first instance of execution of the data analytics application.

A further embodiment includes a tangible computer-readable device having instructions stored thereon that, when executed by at least one computing device, causes the at least one computing device to perform operations that perform predictive scheduling and execution of data analytics applications based on machine learning techniques. The operations may include determining a first prediction entry in a predicted execution schedule based at least on a current timestamp. The operations may also include determining that a first confidence score of the first prediction entry is greater than or equal to a confidence score threshold and determining that an execution prediction of the first prediction entry is greater than or equal to an execution threshold. The operations may further include transmitting a first data analytics application execution request configured to request a first instance of execution of the data analytics application.

Further features and advantages, as well as the structure and operation of various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE FIGURES

The accompanying drawings are incorporated herein and form a part of the specification.

FIG. 3A illustrates example interactions between various components, applications, and systems for generating an execution prediction model based on past data analytics application executions using machine learning techniques according to an example embodiment.

FIG. 3B illustrates an example embodiment of source audit information and target audit information that may be used to generate prediction model training information and prediction model validation information according to an example embodiment.

FIG. 3C illustrates an example embodiment of prediction model training information that may be generated based at least on the source audit information and the target audit information according to an example embodiment.

FIG. 4B illustrates an example embodiment of a predicted execution schedule that may be generated according to an example embodiment.

Figure 1:
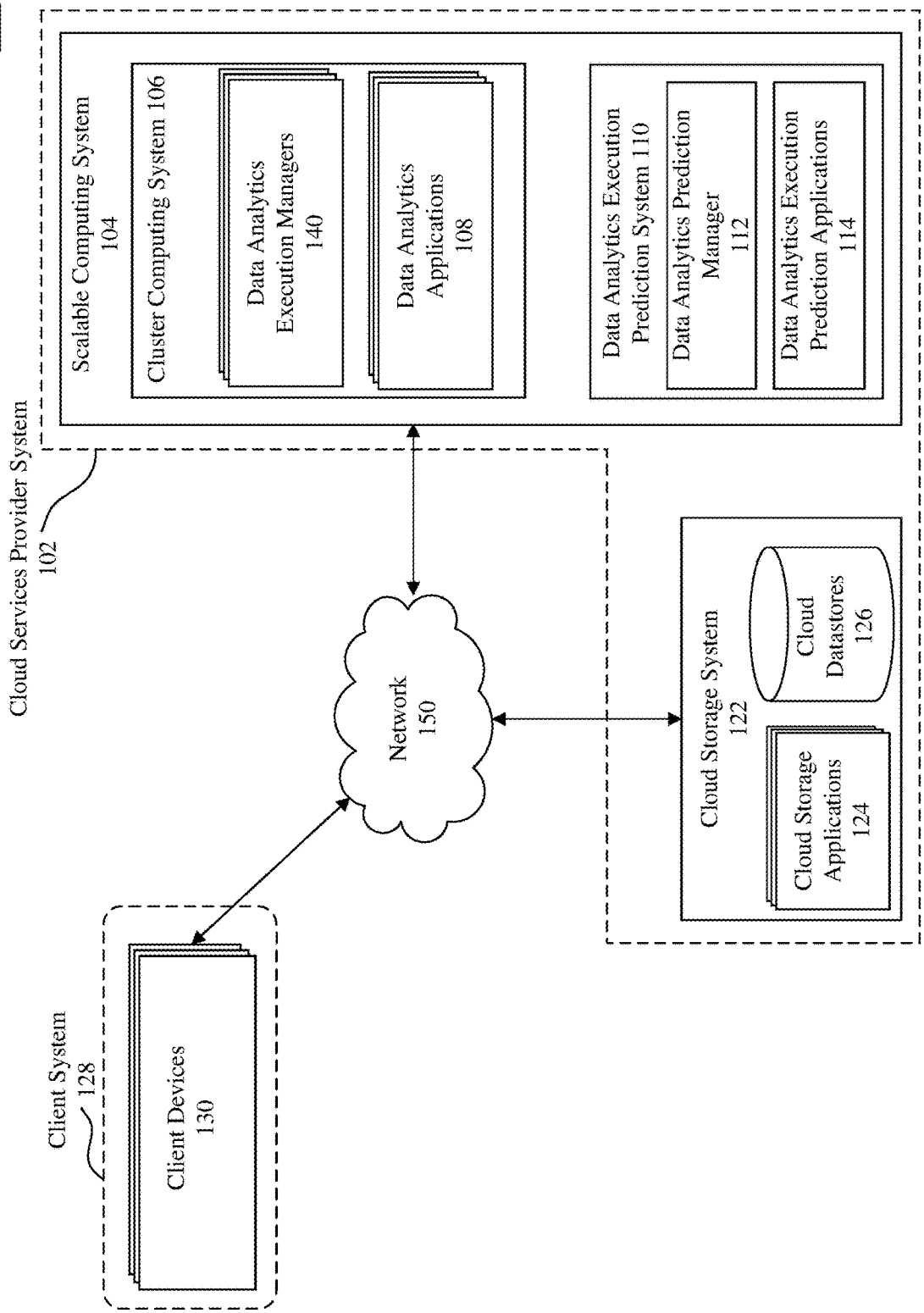
FIG. 1 illustrates a predictive execution and scheduling system for predicting and executing data analytics applications of a cluster computing system according to an example embodiment.

Like reference numerals refer to corresponding parts throughout the several views of the drawings. Additionally and generally, the left-most digit(s) of a reference number identifies the drawing in which the reference number first appears. Furthermore, one or more designators to the right of a reference number such as, for example, "a" and "b" and other similar designators are intended to be variables representing any positive integer. Thus, for example, if an implementation sets a value for a=4, then a complete set of components 312-*a* may include components 312-1, 312-2, 312-3, and 312-4. Furthermore, unless explicitly stated otherwise, a complete set of components may vary for a given feature, embodiment, and/or implementation even though the same designator may be used between various features, embodiments, and/or implementations.

DETAILED DESCRIPTION

With the transition to cloud services providers, business organizations have become accustomed to processing a large volume of data on a daily basis using a variety of data analytics applications capable of performing various data analytics operations (e.g., Extract Transform and Load (ETL) operations, Extract Load and Transform (ELT) operations, etc.). In some instances, whether meaningful analysis is performed by data analytics applications may be heavily dependent on whether any new data is available to be analyzed. Thus, continuous or periodic operations throughout the day requires dedicated computing resources to continuously or periodically scan throughout the day to determine whether meaningful analysis may be performed.

And while cloud services provider systems may appear to have nearly infinite amount of computing resources available for use, in practice their availability in a cloud services provider system (e.g., Amazon® Web Services® (AWS®), Microsoft® Azure®, Google® Anthos®, etc.) may be far more limited. For example, cloud services provider systems often divide their physical server devices that provide computing resources to clients into specific geographic locations around the world. With multi-tenant architecture implemented by almost all cloud services provider systems, multiple clients may be required to share the same available computing resources (e.g., server devices and virtual machines, etc.) as one or more tenants in a cloud services provider system. Given the privacy concerns with some clients' data, data analytics may also be confined to a specific geographic location. Additionally, given the amount of clients' data that may need to be processed at specific times and within a specific time limit, each client within a geographic location may be competing for a large amount of computing resources. This combination of factors may consequently severely limit the availability of computing resources during peak demand.

Furthermore, some data analytics operations (e.g., ETL operations, etc.) may require a large number of computing resources to process source or input data (e.g., a computing cluster with large number of master nodes and slave nodes provisioned on multiple virtual machines, etc.). Consequently, continuous or periodic operations throughout the day may require a large number of dedicated computing resources. These computing resources may be allocated regardless of whether there are any meaningful operations to be performed on the data. Thus, in some instances, substantial amount of computing resources may be allocated to perform data analytics operations (e.g., ETL operations, etc.) several times throughout the day even when no changes have been made to the underlying data to necessitate any data analytics operations. This would in turn result in inefficient allocation of computing resources and may even prevent other users and/or teams in the business organization from using these idle computing resources.

While solutions that poll on a periodic basis may alleviate some inefficiencies associated with continuous allocation of computing resources, these computing resources may nonetheless still be allocated in order to determine whether data analysis is required based on any modifications to the underlying source or input data. Thus, to further improve computing resource allocation and reduce inefficiencies caused by unnecessary computing resource allocation, a new and novel technique is needed to generate one or more execution prediction models that may be used to predict one or more time periods of when a data analytics application may perform one or more data analytics operations based at least on its ingested source or input data and target or output data. The one or more execution prediction models may then be used to generate one or more predicted execution schedules for which the data analytics application can be executed in accordance with the one or more predicted execution schedules. It can be appreciated that by executing the one or more data analytics applications in accordance with the appropriate predicted execution schedules, the one or more data analytics applications may be executed in accordance with predictions of when meaningful data analytics operations may occur so that unnecessary allocation and utilization of computing resources is avoided.

In some embodiments, the term "computing resource" as discussed throughout the detailed description may generally represent any hardware and/or software systems, applications, and/or components. In some embodiments, the "computing resource" may vary based on the context in which it is discussed throughout. For example and in the context of a scalable computing system (e.g., scalable computing system 104), a "computing resource" may represent a virtual machine (e.g., virtual machine 210-1, etc.), a server device (e.g., server device 280-3, etc.), and/or the like. In another example and in the context of a cluster computing system (e.g., cluster computing system 106), a "computing resource" may represent a computing cluster (e.g., master node 206 and slave nodes 208-1, 208-2, 208-3, 208-4, 208-5, etc.), a virtual machine (e.g., virtual machine 210-1, etc.), and/or the like. In a further example and in the context of a server device (e.g., server device 280-1, etc.), a "computing resource" may represent a set of physical processors of a server device (e.g., server device 280, etc.), total RAM of a server device (e.g., server device 280, etc.).

In some embodiments, the scope and definition of the term "computing resource" may vary depending context, thus the term "cloud computing resource identifier" as discussed throughout the detailed description may generally represent any identifier that may be assigned to hardware and/or software systems, applications, and/or components to identify these systems, applications, and/or components. For example and in the context of a cluster computing system (e.g., cluster computing system 106), a "cloud computing resource identifier" may include a cloud computing cluster identifier that identifies a computing cluster. In another example, and in the context of a scalable computing system (e.g., scalable computing system 104), a "cloud computing resource identifier" may include a cloud VM identifier that identifies a virtual machine executing on a server device.

FIG. 1 illustrates a predictive execution and scheduling system 100 for predicting and executing data analytics applications of a cluster computing system 106 according to an example embodiment.

In one embodiment, the predictive execution and scheduling system 100 may include a cloud services provider system 102 and a client system 128. The cloud services provider system 102 may further include a scalable computing system 104, a cloud monitoring system 118, and a cloud storage system 122. The scalable computing system 104 may further include a cluster computing system 106 and a data analytics execution prediction system 110. All of these systems may be operatively and/or communicatively coupled via a network 150.

In various embodiments, the network 150 may be representative of one or more computer and/or telecommunications networks that may enable coupled and/or interconnected systems and/or devices to communicate information between and among each other. In various embodiments, the network 150 may include, without limitation, intranet, extranet, Internet, and/or any other local, regional, global telecommunications network.

In various embodiments, the network 150 may include various wireless network devices configured to encode and/or decode information and receive and/or transmit the encoded information as radio signals in frequencies consistent with the one or more wireless communications standards (e.g., Wireless IEEE 802.11, WiMAX® IEEE 802.16, Global Systems for Mobile Communications (GSM), Enhanced Data Rates for GSM Evolution (EDGE), 3G, 4G, Long Term Evolution (LTE®), 5G, Bluetooth standards, Near Field Communications (NFC) standards, etc.). Additionally, or alternatively, the network 150 may also include various wired network devices configured to receive and/or transmit the encoded information as electrical and/or optical signals consistent with one or more wired and/or optical network standards (e.g., Ethernet, Fibre Channel, etc.).

In various embodiments, the cloud services provider system 102 may be representative of a system generally arranged to provide cloud computing services such as, for example, Infrastructure as a Service (IaaS), Platform as a Service (PaaS), Desktop as a Service (DaaS), Software as a Service (SaaS), Storage as a Service (STaaS), Function as a Service (FaaS), Database as a Service (DBaaS), or the like. Additionally, the cloud services provider system 102 may also provide application developers utilizing the client system 128 with tools for accelerated development, deployment, orchestration, and management of their application.

For example, the cloud services provider system 102 may be representative of various data centers of cloud computing services providers (e.g., Microsoft® Azure®, Amazon® Web Services® (AWS®), Google® Compute Engine™, Alibaba® AliCloud®, Digital Ocean®, Vultr®, Linode®, etc.), each implementing a variety of protocols (e.g., Hyper Text Transfer Protocol (HTTP), HTTP Secure (HTTPS), etc.), standard formats (e.g., Representational State Transfer (REST), JavaScript Object Notation (JSON), Extensible markup Language (XML), Remote Procedure Call (RPC), etc.), and/or APIs (e.g., Microsoft® Services Management APIs, Amazon® Elastic Compute Cloud® (EC2®) APIs, Google® Cloud Platform (Anthos®) APIs, etc.). Additionally or alternatively, in some embodiments, cloud services provider system 102 may be representative of data centers internal or external to a client system's 128 organization configured to provide cloud computing services.

In some embodiments, one or more systems within the cloud services provider system 102 may be geographically separated (e.g., separate physical locations, etc.) and virtually separated (e.g., separate network domains, etc.). In some embodiments, one or more systems within the cloud services provider system 102 may be substantially geographically co-located (e.g., in substantially the same physical location, etc.) and virtually connected (e.g., in the same network domain, etc.). Alternatively, in some embodiments, one or more systems within the cloud services provider system 102 may be geographically separated yet virtually connected or substantially geographically co-located yet virtually separated.

In an example embodiment, the scalable computing system 104 may be generally arranged to provide underlying hardware and/or software infrastructure for at least the cluster computing system 106 and data analytics execution prediction system 110. The underlying hardware and/or infrastructure may typically include server devices, storage devices, networking devices, and virtualization services.

For example, the scalable computing system 104 be generally arranged to include a plurality of server devices, where each server device may be generally configured to execute at least one virtual machine. The scalable computing system 104 may also be generally arranged to provision the at least one virtual machine to the plurality of server devices based at least on requests from the cloud services provider system 102 and/or client system 128. Each provisioned virtual machine may be further configured to include specialized applications, libraries, data, and/or configurations.

In an example embodiment, the scalable computing system 104 may further include a cluster computing system 106 configured to execute a plurality of data analytics applications 108 for data analysis (e.g., machine learning, scientific simulations, data transformations, bioinformatics, financial analysis, etc.) of a client's data. In an example embodiment, the cluster computing system 106 may be generally arranged to execute at least one data analytics execution manager 140 and the plurality data analytics applications 108 on the underlying hardware and/or software infrastructure of the scalable computing system 104.

In an example embodiment, the plurality data analytics applications 108 (e.g., Amazon® AWS Glue®, Google® BigQuery®, Apache® Beam®, NetOwl®, SAS Institute Inc. SAS/STAT®, Esri® ArcGIS®, etc.) may be generally configured to operate with a distributed framework (e.g., Apache® Hadoop®, Apache® Spark®, Amazon® AWS Data Pipeline®, Apache® Airflow®, Google®, Dataflow®, etc.) to perform real-time and/or batch based parallel processing of clients' data, which may be provided by the client system 128 and stored in cloud storage system 122. In an example embodiment, the at least one data analytics execution manager 140 may be generally configured to manage the execution of the plurality of data analytics applications 108.

In an example embodiment, the one or more cloud storage applications 124 may be configured to store data (e.g., machine learning training data for machine learning algorithms, scientific data for scientific simulations, financial data for financial analysis, configuration data for configuring applications, etc.) associated with a user of the client system 128 or an application of client system 128 in one or more distributed cloud datastores 126. In an example embodiment, to facilitate the storage and retrieval of data, the one or more cloud storage applications 124 may be configured to receive cloud storage requests to store data within the one or more cloud datastores 126. In an example embodiment, to facilitate the retrieval of data, the one or more cloud storage applications 124 may be configured to receive cloud retrieval requests from systems and/or applications to retrieve data stored within the one or more cloud datastores 126. In response to the cloud retrieval requests, the one or more cloud storage applications 124 may be further configured to transmit cloud retrieval responses with the requested data to the systems and/or applications based on the received cloud retrieval requests.

In an example embodiment, the client system 128 may be representative of computing systems within a business organization utilizing services provided by the cloud services provider system 102. In an example embodiment, the client system 128 may include, without limitation, one or more client devices 130 that may be used by one or more users and/or teams of a business organization utilizing the services of the cloud services provider system 102. For example, one or more users and/or teams of the one or more client devices 130 may request execution of data analytics applications 108 in a cluster computing system 106 to perform data analysis on client's data stored within the distributed cloud datastores 126.

In an example embodiment, the data analytics execution prediction system 110 may include without limitation, data analytics prediction manager 112 and one or more data analytics execution prediction applications 114. In an example embodiment, the data analytics prediction manager 112 may be generally configured to provide one or more APIs that are configured to enable management and configuration of the data analytics execution prediction system 110. In an example embodiment, the data analytics prediction manager 112 may also be generally configured to provide one or more APIs to manage one or more requests (e.g., predicted execution schedule request, etc.) and provide one or more responses (e.g., predicted execution schedule response, etc.) from the one or more data analytics applications 108.

In an example embodiment, the one or more data analytics execution prediction applications 114 may be generally configured to generate one or more execution prediction models based at least on analysis of audit information. The one or more execution prediction models may be used to predict one or more time periods of when the one or more data analytics application may perform one or more data analytics operations (e.g., ETL operations, ELT operations, map and reduce operations, statistical analysis operations, etc.) based at least on its ingested source or input information and target or output information.

In an example embodiment, the data analytics execution prediction applications 114 may be generally configured to at least generate prediction model training information and prediction model validation information based at least on audit information associated with the execution of one or more data analytics operations. In an example embodiment, the data analytics execution prediction applications 114 may also be generally configured to generate one or more execution prediction models based at least on the prediction model training information and prediction model validation information. In an example embodiment, the data analytics execution prediction applications 114 may further be generally configured to generate one or more predicted execution schedules based at least on corresponding one or more execution prediction models.

Figure 2A:
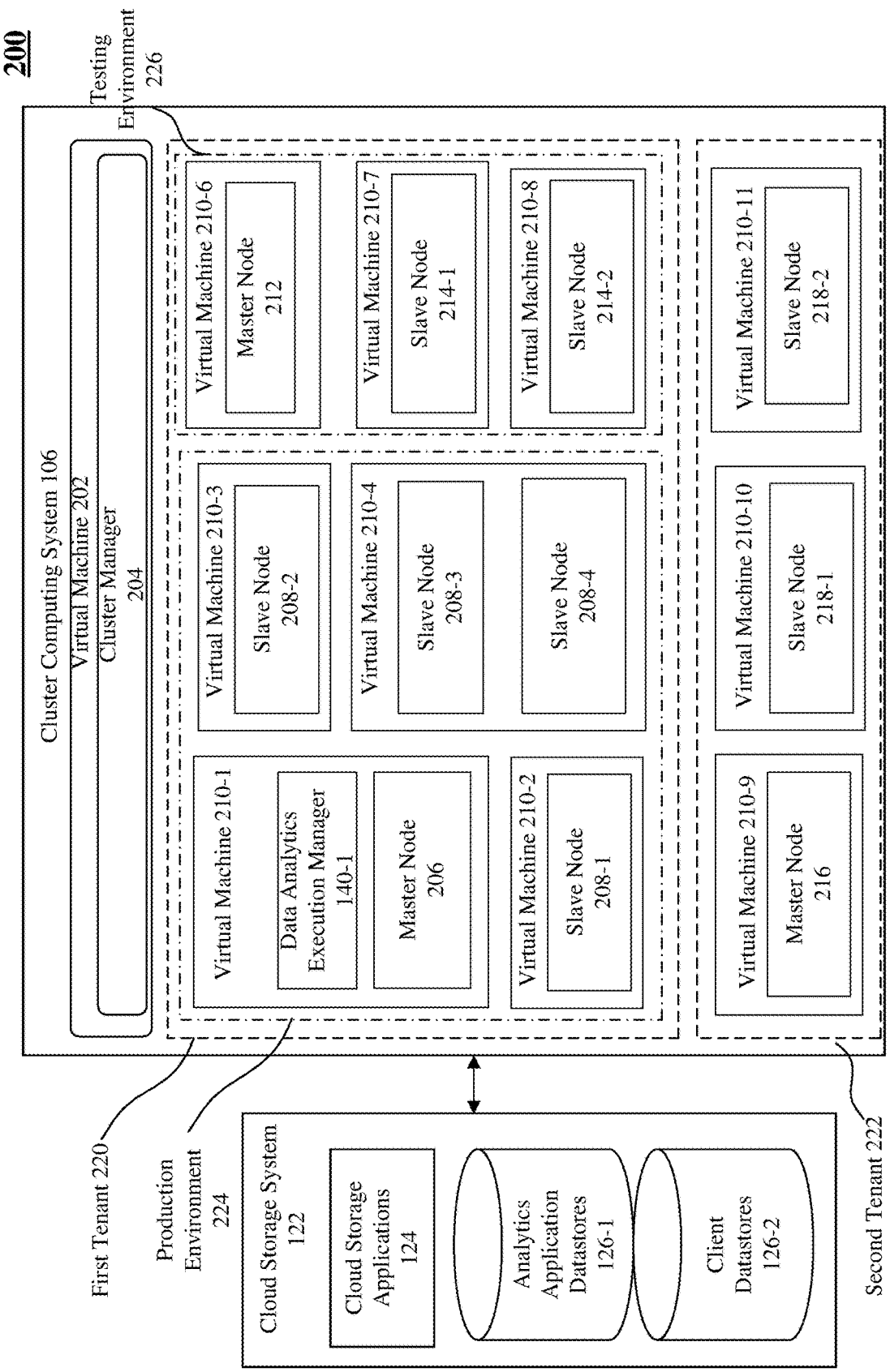
FIG. 2A illustrates a cluster computing system operatively coupled to a cloud storage system for performing data analytics according to an example embodiment.

FIG. 2A illustrates a cluster computing system 106 operatively coupled to the cloud storage system 122 for performing data analytics according to an example embodiment.

In an example embodiment, the cloud storage system 122 may further include, without limitation, the data analytics application datastores 126-1 and the client datastores 126-2. Some examples of data stores may include distributed datastores, which may be on-premises or off-premises storage instances, STaaS instances, cloud-based block storage, or cloud-based object storage, for example, including Amazon® Simple Storage Service (S3), Microsoft® Azure® Storage, Minio® Object Storage, IBM® Bluemix® Object Storage, IBM® Cleversafe® Object Storage, Cloudian® HyperStore® or HyperFile®, or the like.

In an example embodiment, the data analytics application datastores 126-1 may be configured to store one or more data analytics applications 108 for provisioning by the cluster manager 204. For example, the data analytics application datastores 126-1 may be configured as a container registry for storing data analytics applications 108 and data analytics execution manager 140 as container application images. In an example embodiment, the client datastores 126-2 may store client's data for data analysis by the one or more data analytics applications 108. It can be appreciated that while the data analytics applications 108 are not illustrated in FIG. 2A, at least one master node (e.g., master node 206) and at least one slave node (e.g., slave nodes 208-1, 208-2, 208-3, 208-4, 208-5) may represent an execution of a data analytics application in the cluster computing system 106.

In an example embodiment, the cluster computing system 106 may include, without limitation, a plurality of cluster nodes (e.g., master nodes 206, 212, 216, slave nodes, 208, 214, 218, etc.). In an example embodiment, the cluster computing system 106 may include at least one master node (e.g., master node 206) and at least one slave node (e.g., slave nodes 208-1, 208-2, 208-3, 208-4, 208-5) configured to operate in a master-slave configuration in order to perform data analysis of a client's data (e.g., machine learning training data for machine learning algorithms, scientific data for scientific simulations, financial data for financial analysis, etc.) stored in the client datastores 126-2. In such configurations, the combination of at least one master node and at least one slave node operating in a master-slave configuration may represent a computing cluster executing a data analytics application in a distributed fashion.

Figure 5A:
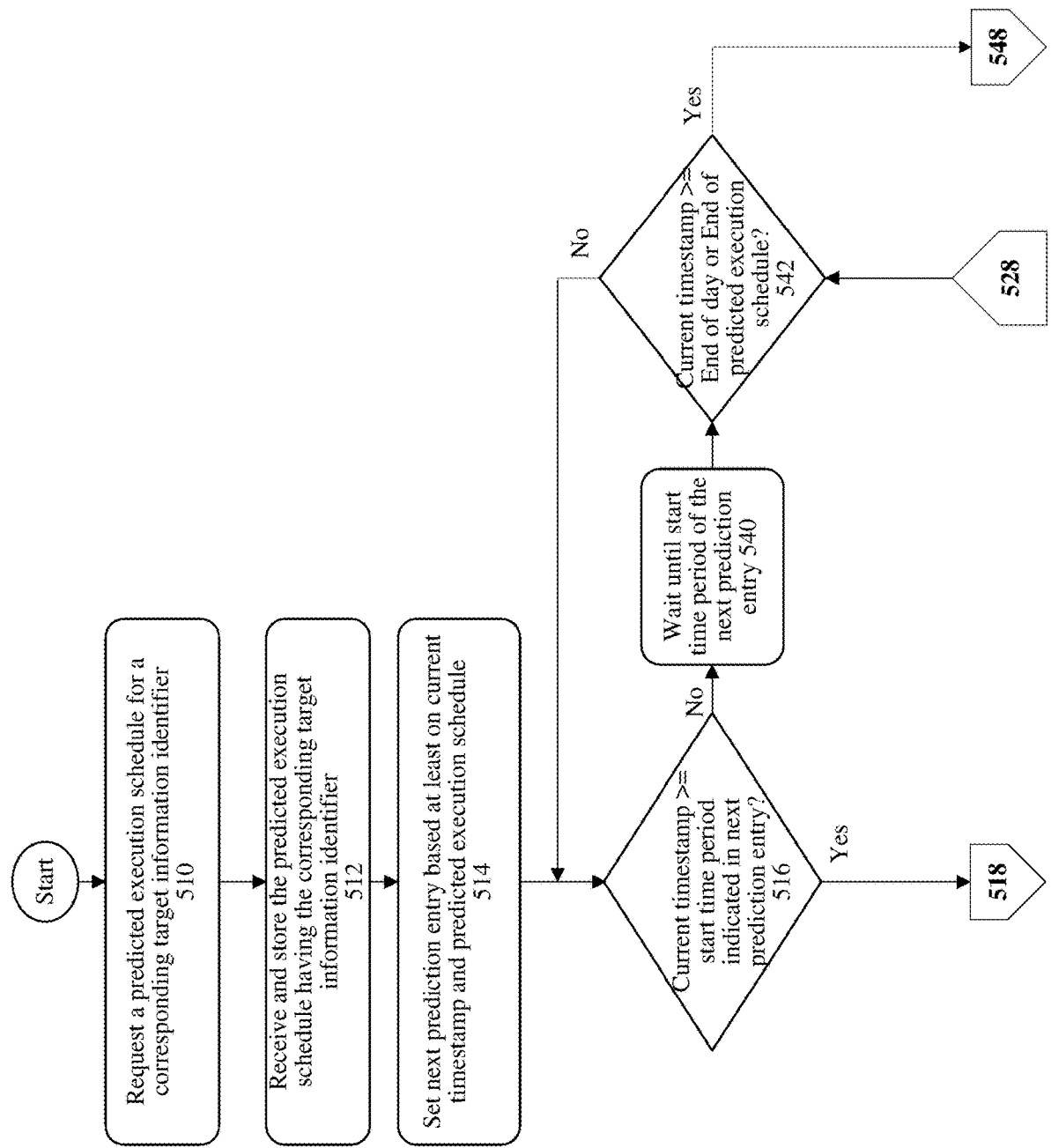
FIGS. 5A-5B illustrate an example logic flow that may be performed by a data analytics execution manager for executing one or more data analytics applications according to a predicted execution schedule in an example embodiment.
Figure 5B:
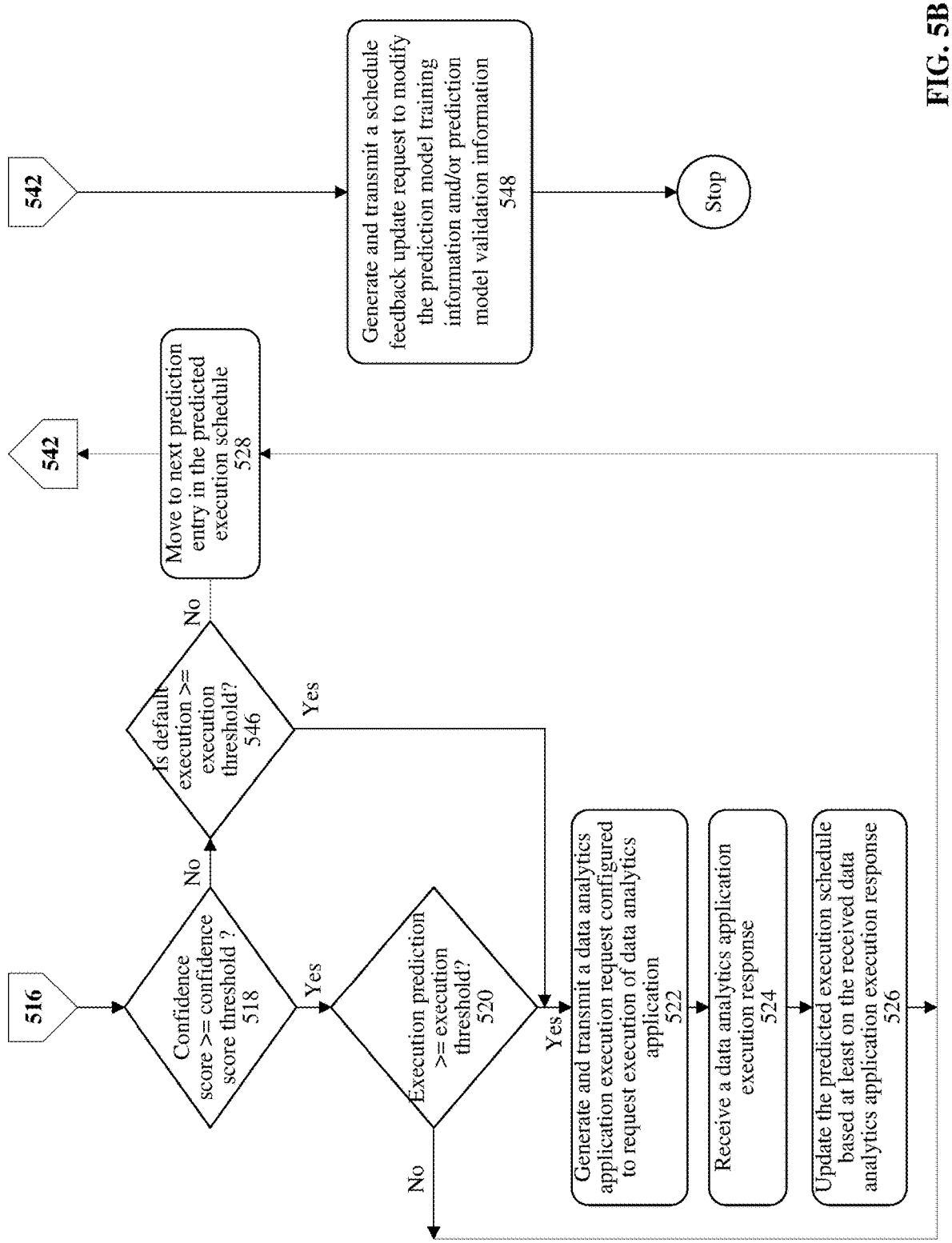

In an example embodiment, and to initiate the execution of a computing cluster, the data analytics execution manager (e.g., data analytics execution manager 140-1) may be generally configured to execute a computing cluster periodically or in accordance with one or more schedules further discussed with respect to FIGS. 5A-5B. While not explicitly illustrated and depending on implementation, it can be appreciated that the data analytics execution manager (e.g., data analytics execution manager 140-1) may be integrated within a master node (e.g., master node 206) of computing cluster. In such implementations, the provisioning, execution, and/or termination of the data analytics execution manager may be dependent upon the master node.

In an example embodiment, and to facilitate the operation of a computing cluster, the one or more master nodes (e.g., master node 206, etc.) may be generally configured to manage (e.g., request, terminate, etc.) the execution of computing tasks by one or more slave nodes (e.g., slave node 214-1, 214-2, etc.). The one or more master nodes (e.g., master node 206, etc.) may also be configured to monitor the operational status of the execution of computing tasks by one or more slave nodes (e.g., slave node 214-1, 214-2, etc.)

and may transmit the operational status to the cluster manager 204. The one or more slave nodes may be configured to execute one or more computing tasks on the respective virtual machines (e.g., virtual machines 210-6, 210-7, 210-8, etc.) in parallel. In an example embodiment, the computing tasks may include, without limitation, extract transform and load (ETL) tasks, extract, load, and transform (ELT) tasks, map and reduce tasks, machine learning (ML) tasks (e.g., ML classification tasks, ML clustering, ML regression, ML image classification, ML object recognition tasks), statistical analysis tasks (e.g., distributed R and SAS, etc.), financial analysis tasks, and/or the like. These computing tasks may also be performed on the client's data stored in the client datastores 126-2.

For example, and with respect to a first computing cluster, the master node 206 may be configured to schedule and distribute one or more financial analysis tasks to slave nodes 208-1, 208-2, 208-3, 208-4, and 208-5 for execution in parallel. In another example and with respect to a second computing cluster, the master node 212 may be configured to schedule and distribute one or more map and reduce tasks to slave nodes 214-1 and 214-2 for execution in parallel on client's data stored in the client datastores 126-2. In a further example, the master node 216 may be configured to schedule and distribute ML clustering tasks to slave nodes 218-1 and 218-2 for execution in parallel on client's data stored in the client datastores 126-2.

In an example embodiment, and to execute the one or more data analytics applications 108, the cluster computing system 106 may include one or more virtual machines 202 and 210. In an example embodiment, the amount of computing resources (e.g., virtual processors, RAM, maximum network bandwidth, maximum storage, maximum storage bandwidth, etc.) available for each virtual machine may vary based on associated virtual machine (VM) configuration parameters and the underlying hardware that hosts a virtual machine.

For example, the VM configuration parameters may define optimization(s) of the virtual machine (e.g., optimized for general-purpose computing, optimized for accelerated computing, optimized for memory intensive computing, etc.) number of virtual processors (e.g., 1, 2, 4, 6, 8, 16, 24, 32, 64, 128, etc.) available to one or more virtual machines, overall processing bandwidth of one or more virtual machines (e.g., cumulative cycles per second, floating-point operations per second (FLOPS), etc.), the amount of RAM available to the virtual machine(s) (e.g., 16 GB, 32, GB, 64, GB, 128 GB, etc.), maximum network bandwidth available to the virtual machine(s) (e.g., 1, Gbps, 10 Gbps, etc.), amount of storage available to the virtual machine(s) (6 TB, 12, TB, etc.), maximum storage bandwidth available to the virtual machine(s) (e.g., 3,500 Mbps, 7,000 Mbps, 14,000 Mbps, etc.), operating system(s) of the virtual machine(s) (e.g., Microsoft® Windows® Server, Canonical® Ubuntu® Server, Debian® Linux®, CentOS® Linux®, IBM® Red Hat® Linux®, CoreOS® Container Linux® (rkt), etc.), geographic region of the virtual machine (e.g., Northern Virginia, Ohio, Northern California, Montreal, Ireland, Frankfurt, Singapore, etc.), and/or the like.

In an example embodiment, and to manage one or more computing clusters executing on one or more virtual machines 210, virtual machine 202 may be associated with and managed by a cloud computing services provider of the cloud services provider system 102. The virtual machine 202 may include, without limitation, a cluster manager 204, which may also be managed by the cloud computing services provider. In an example embodiment, the cluster manager 204 may be configured to establish communication sessions with one or more systems and applications to perform one or more management operations with one or more computing clusters as further discussed below.

In an example embodiment, the cluster manager 204 may be generally configured to provision a data analytics application stored in the analytics application datastores 126-1 as one or more computing clusters for execution on the one or more virtual machines 210. Each provisioned computing cluster may be identified by a cloud computing cluster identifier, a client assigned computing resource identifier, and/or client assigned computing resource name. In an example embodiment, the cloud computing cluster identifier, may be a unique alphanumeric identifier among all other computing clusters and may be assigned by the cloud computing services provider of cloud services provider system 102. In an example embodiment, the client assigned computing resource identifier and/or the client assigned computing resource may each be a unique alpha numeric identifier and may identify one or more computing resources used by one or more users and/or teams of the client system 128. For example, the client assigned computing resource name may provide a descriptive name for the one or more computing resources.

In an example embodiment, the cluster manager 204 may also be generally configured to provision a data analytics execution manager stored in the analytics application datastores 126-1 for execution on the one or more virtual machines 210. In an example embodiment, the provisioned data analytics execution manager may be configured to initiate the execution of one or more provisioned computing clusters in accordance with one or more corresponding schedules as further discussed with respect to FIGS. 5A and 5B.

In some implementations, the cluster manager 204 may include a message-passing interface (MPI) or equivalent, distributed interprocess communication (DIPC) protocol, single-system image (SSI) architecture, virtual-kernel architecture, load balancer, distributed manager for storage or memory in clustered computing applications, and/or other cluster middleware, according to some embodiments. Further examples of cluster manager 204 may include Slurm™ Workload Manager, OpenSSI, LinuxPMI/openMosix, Kerrighed™, gLite™ Apache® Mesos®, Apache® Spark® framework, or the like, which may include executable code, interpreted code, managed code, library code, etc., as described further below.

In an example embodiment, and to ensure there are adequate computing resources allocated during provisioning of one or more computing clusters and/or one or more data analytics execution managers, the cluster manager 204 may be configured to transmit one or more virtual machine (VM) provisioning request to the scalable computing system 104. The VM provisioning request may be configured to request the scalable computing system 104 to provision one or more virtual machines 210 based on the one or more cluster provisioning requests. The cluster manager 204 may be further configured to terminate the execution of one or more computing clusters based on a cloud computing command request received from one or more systems and/or applications via an established communication session. Additionally, and based on the cloud computing command request, the cluster manager 204 may also generate and transmit one or more VM termination requests to the VM manager 284 to request one or more virtual machines that are no longer used any master node or slave node of a computing cluster.

In an example embodiment, and to reduce possibilities of cross contamination between a client's data and its computing resources used during testing or quality assurance versus the client's data and its computing resources used during production, the one or more cluster creation parameters may further include, without limitation, a client assigned environment identifier that identifies the development environment associated with the computing cluster used by the client system 128. In an example embodiment, the client assigned environment identifier may identify whether a computing cluster used by the client system 128 is part of a testing environment 226 or a production environment 224.

For example, a first computing cluster, which may include the data analytics master node 206 and slave nodes 208-1, 208-2, 208-3, 208-4, and 208-5, may be identified as being part of the production environment 224. Continuing with the previous example, the data analytics execution manager 140-1 may also be identified as being part of the production environment 224. In another example, a second computing cluster, which may include the master node 212 and slave nodes 214-1 and 214-2, may be identified as being part of the testing environment 224.

In an example embodiment, the cloud services provider system 102 may be configured to operate utilizing a multi-tenant architecture. In an example embodiment, one or more the computing resources (e.g., computing clusters, virtual machines, virtual processors, RAM, local storage, etc.) of the cluster computing system 106 may be shared between multiple tenants. In one example, cluster computing system 106 may be divided between a first tenant 220 that is utilized by users of client system 128 and a second tenant 222 that is utilized by different users of different client system 128 (not shown), where at least some of the underlying hardware and/or software may be shared (e.g., sharing of physical server devices, sharing of a physical processor with multiple physical cores, sharing total RAM, etc.). It can be appreciated, however, that despite sharing one or more computing resources, a tenant's or a client's data stored in client datastores 126-1 is typically isolated from other tenants or clients.

Figure 2B:
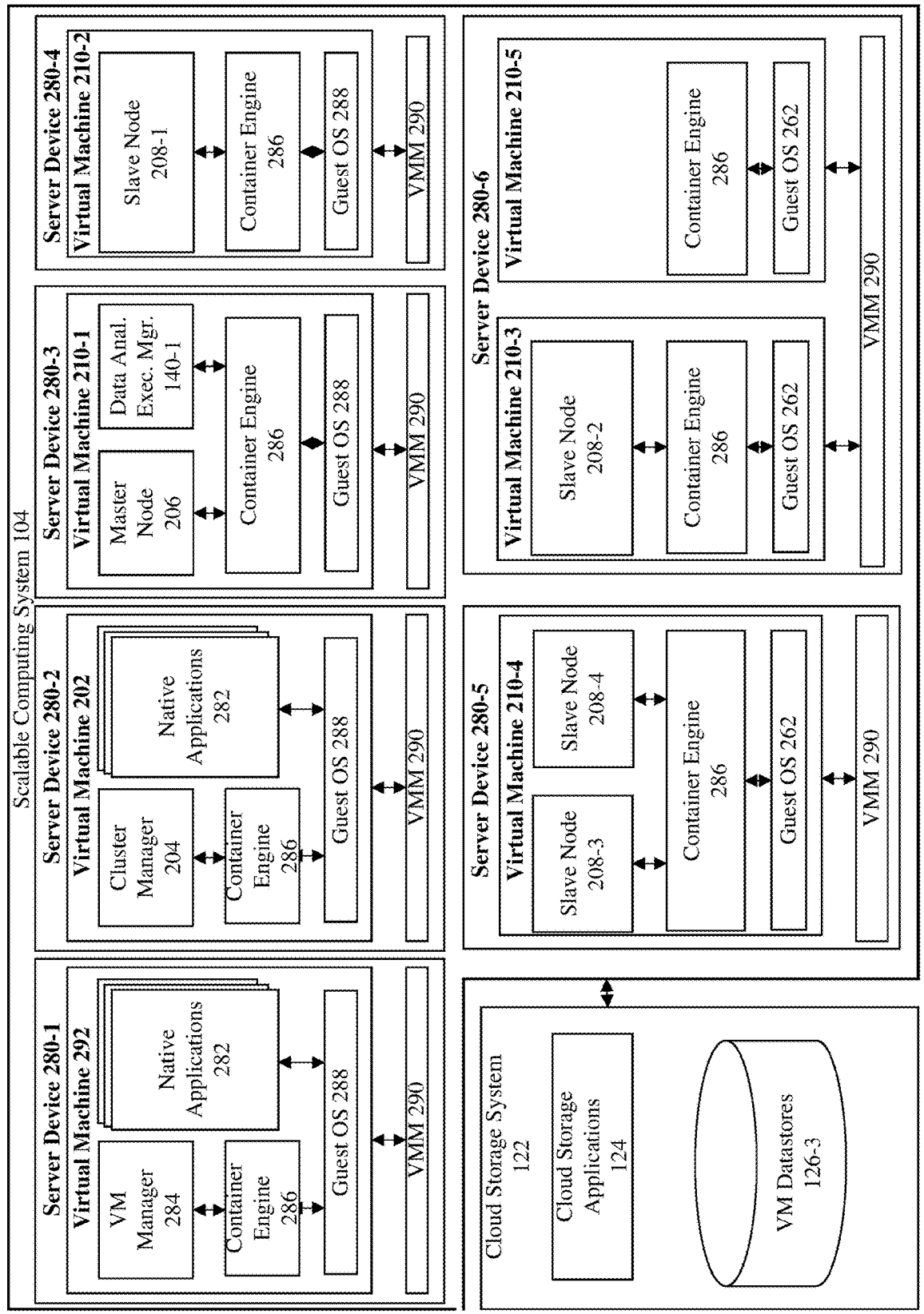
FIG. 2B illustrates server devices of a scalable computing system configured to host one or more virtual machines according to an example embodiment.

FIG. 2B illustrates server devices 280 of the scalable computing system 106 configured to host one or more virtual machines 292, 202, and 210 according to an example embodiment.

As previously illustrated and discussed in FIG. 2A, one or more data analytics execution managers may be provisioned to one or more virtual machines 210 for execution. Additionally as previously illustrated and discussed in FIG. 2A, one or more master nodes and slave nodes of one or more computing clusters may be provisioned to one or more virtual machines 210 for execution. Also previously illustrated and discussed in FIG. 2A, the cluster manager 204 may itself be hosted in a virtual machine (e.g., virtual machine 202). In an example embodiment, the cloud storage system 122 may further include, without limitation, virtual machine (VM) datastores 126-3 configured to store virtual machine images with associated virtual machine configuration parameters.

In an example embodiment, to provide virtual machines 202 and 210 with physical hardware for execution of their applications, the scalable computing system 104 may include, without limitation, one or more server devices 280. In an example embodiment, each of the server devices 280 of the scalable computing system 104 may also vary based on their available computing resources (e.g., number of physical processors, amount of RAM, maximum amount of storage, maximum amount of network bandwidth, etc.). For example, one or more server devices 280 may be configured for specific hardware optimizations (e.g., optimized for general purpose computing, optimized for accelerated computing, optimized for memory intensive computing, etc.) and may vary by number of physical processors (e.g., 1, 2, 4, 6, 8, 16, 24, 32, 64, 128, etc.), overall processing bandwidth of one or more processors (e.g., cumulative cycles per second, floating-point operations per second (FLOPS), etc.), the amount of installed RAM (e.g., 16 GB, 32, GB, 64, GB, 128 GB, etc.), vary by the maximum network bandwidth available (e.g., 1, Gbps, 10 Gbps, etc.), the amount of storage installed (6 TB, 12, TB, etc.), the maximum storage bandwidth available (e.g., 3,500 Mbps, 7,000 Mbps, 14,000 Mbps, etc.), and/or the like.

In an example embodiment, the server devices 280 may be geographically separated (e.g., separate physical locations, etc.) and virtually separated (e.g., separate network domains, etc.). In other embodiments, the server devices 280 may be substantially geographically co-located (e.g., in substantially the same physical location, etc.) and virtually connected (e.g., in the same network domain, etc.). Alternatively, in some embodiments, the server devices 280 may be geographically separated yet virtually connected or substantially geographically co-located yet virtually separated. For example, the server device 280-1 may be physically located in one geographic region separate from the server device 280-2, 280-3, 280-4, 280-5, and 280-6, yet virtually connected. In an example embodiment, the availability of server devices 280 and their associated computing resources may vary based on the geographic region. For example, availability of server devices 280 configured to handle memory-intensive computing with 64 physical processors and 128 GB of RAM may be limited in Northern Virginia and as compared to Northern California. Other performance measures, including latency and cost, may also be considered.

In an example embodiment, each of the server devices 280 of the scalable computing system 104 may be configured to include, without limitation, a hypervisor or virtual machine monitor (VMM) (e.g., VMM 290 of server device 280-1). In an example embodiment, the VMMs 290 may be configured to execute directly on the server devices (e.g., server devices 280) and manage the concurrent execution of one or more virtual machines 292, 202, and 210 (e.g., virtual machine 210-3 virtual 210-5 of server device 280-6). For example, VMM 290 of server device 280-1 may be representative of a native or bare-metal hypervisor (e.g., VMware® ESXi™ hypervisor, Microsoft® Hyper-V® hypervisor, KVM hypervisor, Proxmox™ VE hypervisor, Citrix® XenServer® Xen™ hypervisor, etc.) configured to execute and/or manage one or more instances of virtual machines 292, 202, and/or 210. Additionally, or alternatively, hosted VMMs may be run on a native host operating system. With sufficient hardware virtualization support (e.g., AMD® AMD-V, AMD-Vi, AMD-RVI; Intel® VT-x, VT-i, VT-d; ARM® Virtualization Extensions, System Memory Management Unit (SMMU), TrustZone®; Samsung® Exynos® SysMMU; Sun® Input-Output Memory Management Unit (IOMMU); other IOMMU, SMMU, or equivalent virtualization-extensions architecture, etc.) underlying the host operating system, hosted VMMs may run one or more virtual machines 292, 202, and/or 210 with native or near-native performance. Examples of hosted VMMs include VMware® Server, Oracle® VirtualBox®, Oracle® Virtual Iron™, BSD® Hypervisor (Bhyve™) QEMU™, etc.

In an example embodiment, the one or more virtual machines 292, 202, and 210 may include, without limitation, a guest operating system (OS) 288 (e.g., Microsoft® Windows® Server, Canonical® Ubuntu® Server, Debian® Linux®, CentOS® Linux®, IBM® Red Hat® Linux®, CoreOS® Container Linux®, Intel® Clear Linux®, Microsoft® Azure® Sphere®, etc.). In an example embodiment, each guest OS may be generally configured to execute one or more native applications 282 and one or more container engines 286 (e.g., Docker® Engine, rkt, LXC™ (including Anbox™), Oracle® Solaris® Zones, FreeBSD® Jails, Linux® cgroups, IBM® AIX® Workload Partitions, Virtuozzo® OpenVZ®, etc.). Containers may refer generically to any software-level or OS-level virtualization or paravirtualization, in some embodiments. In an example embodiment, the native applications 282 of may be configured to assist in the execution of the master nodes and/or slave nodes in container engines 286 of the one or more guest OS 288. In some embodiments, master and/or slave nodes may form a part of a distributed software and/or storage framework, such as Apache® Hadoop®, Amazon® Elastic MapReduce, or similar software ecosystems and that may be hosted in at least one virtual machine (e.g., virtual machines 210-1 through 210-5). In an example embodiment, the native applications 282 may also share a common execution environment with a container engine in a guest OS 288.

In an example embodiment, each of the one or more container engines 286 may be configured to host and manage the execution of one or more container applications such as, the cluster manager 204, data analytics execution manager (e.g., data analytics execution manager 140-1), one or more master nodes (e.g., master node 206 hosted of virtual machine 210-1), and/or one or more slave nodes (e.g., slave nodes 208-3 and 208-4 of virtual machine 210-4). It can be appreciated that in some implementations, the one or more master nodes and slave nodes may be executed by the container engine 286 in one or more container instances, where each container instance (not shown) may execute the master nodes and/or slave nodes in its own isolated runtime environment. Thus, each container instance may include, without limitation, a container operating system (OS), one or more container applications associated with the master nodes and/or slave nodes, and associated container components (e.g., executable binaries, support libraries, etc.) to support the execution of the master nodes and slave nodes.

In an example embodiment, and to assist in the management of one or more virtual machines 210 executing on one or more server devices 280 (e.g., server devices 280-3, 280-4, 280-5, 280-6, etc.), the server device 280-1 may include virtual machine 292 may be managed by the cloud computing services provider of the cloud services provider system 102. In an example embodiment, the virtual machine 292 may include a virtual machine (VM) manager 284 configured to provision virtual machines based on one or more virtual machine (VM) provisioning requests received from one or more systems and/or applications (e.g., client manager 204, serverless manager 232, etc.). In an example embodiment, a VM provisioning request may include one or more VM provisioning parameters. The one or more VM provisioning parameters may include, without limitation, a number of virtual machines to provision and the VM configuration parameters as previously discussed with respect to FIG. 2A for each virtual machine.

In an example embodiment, and in response to the VM provisioning request, the VM manager 284 may be configured to identify one or more server devices 280 with available computing resources that can match or otherwise satisfy the VM provisioning request. After identifying one or more available server devices 280, the VM manager 284 may be further configured to provision one or more virtual machines 210 having the VM configuration parameters specified in the VM provision request to the available one or more available server devices 280. Each of the provisioned virtual machines 210 may be identified by a cloud VM identifier, which may be a unique alphanumeric identifier among all other cloud VM identifiers and may be assigned by the cloud computing services provider of cloud services provider sy stem 102.

For example, and to provision the one or more virtual machines 210, the VM manager 284 may identify and/or configure one or more VM images stored in the VM datastores 126-3 with the specified VM configuration parameters. Continuing with the example, the VM manager 284 may further transmit or cause the transmission of the identified and/or configured one or more VM images to VMMs 290 of the identified one or more server devices 280 with available computing resources. It is to be appreciated that each of the identified and/or configured VM images may be appropriately matched with the computing resources available of the identified one or more server devices 280. Continuing with the example, the VM manager 284 may then configure and/or request the execution of the VM images on the identified one or more server devices 280 by the respective VMMs 290.

In an example embodiment, the VM manager 284 may be further configured to transmit a VM provisioning response to each of the systems and/or applications that transmitted a VM provisioning request. The VM provisioning response may include, without limitation, one or more cloud VM identifiers assigned to each provisioned virtual machine. In an example embodiment, the VM manager 284 may also be configured to receive VM termination requests from the one or more systems and/or applications, which may include the one or more cloud VM identifiers. Thus, the cloud VM identifiers may be used by the systems and/or applications to terminate a previously provisioned virtual machines so as to free up any computing resources (e.g., physical processors, RAM, of the server devices) used by the identified virtual machines to be terminated. In an example embodiment, the VM manager 284 may include a combination of hardware (e.g., physical processors, memory, application specific integrated circuit (ASIC), field programmable gate array (FPGA)) and/or executable software (e.g., executable code, interpreted code, managed code, library code, etc.)

Examples of VM manager 284 may include Apache® CloudStack®, IBM® Red Hat® Virtual Machine Manager (virt-manager)™, IBM® Red Hat® Libvirt™, Kimchi Project™ Kimchi, TotalCloud®, Citrix® GoTo Cloud Services®, etc. Additionally or alternatively, software for orchestration of containers or virtual machines may fulfill the role of VM manager 284. Further examples of VM manager 284 in an orchestration role may include Spotinst™ Elastigroup™, Google® Kubernetes®, Google® Ganeti®, IBM® Red Hat® oVirt®, Proxmox™ Virtual Environment (VE), OpenQRM™, Microsoft® System Center Virtual Machine Manager (SCVMM), IBM® Red Hat® OpenShift®, Amazon® Elastic Container Service (ECS), etc.

Figure 2C:
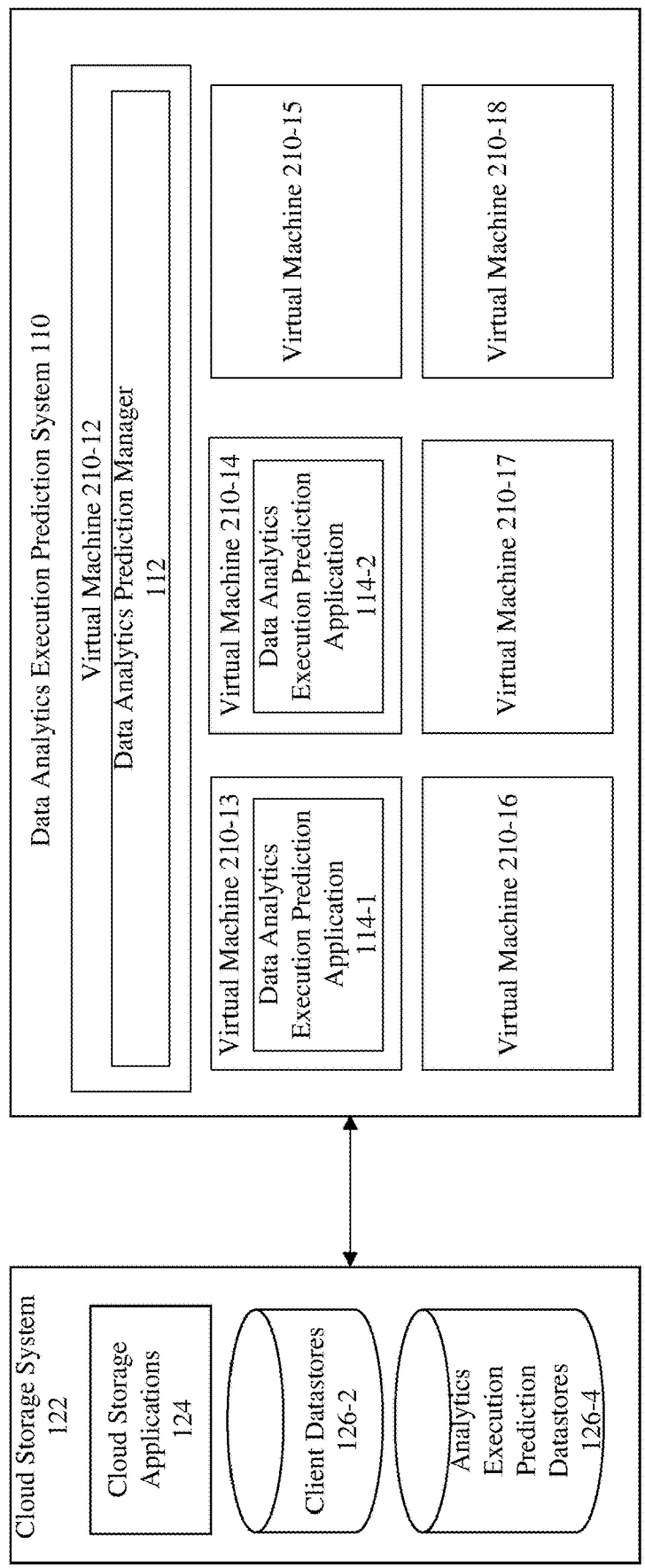
FIG. 2C illustrates the components of a data analytics execution prediction system according to an example embodiment.

FIG. 2C illustrates a data analytics execution prediction system 110 operatively coupled to the cloud storage system 122 for predictive scheduling and execution of data analytics applications based on machine learning techniques.

In an example embodiment, the cloud storage system 122 may further include, without limitation, the client datastores 126-2 and analytics execution prediction datastores 126-4. In an example embodiment, the client datastores 126-2 may be configured to store client information that requires analysis by the one or more data analytics applications. Additionally, the client datastores 126-2 may also be configured to store client information (e.g., financial information, sales information, insurance information, personal information, demographics information, etc.) that may require analysis and processing (e.g., ETL operations, MapReduce operations, etc.) by the one or more data analytics applications. In an example embodiment, the analytic execution prediction datastores 126-4 may be configured to store one or more data analytic execution prediction applications 114.

In an example embodiment, the data analytics execution prediction system 110 may include a data analytics prediction manager 112 and one or more data analytics execution prediction applications 114 executing on one or more virtual machines 210. In an example embodiment, the data analytics prediction manager 112 may be generally configured to allow configuration of the one or more data analytics execution prediction applications 114 by the one or more client devices 130 of a business organization. In an example embodiment, the data analytics prediction manager 112 may also be configured to manage the execution of one or more data analytics execution prediction applications 114 as further discussed with respect to at least FIGS. 3A-3B and 4A-4B. To support these operations, the data analytics execution prediction system 110 may also be configured to provide one or more APIs (not shown) configured to receive one or more requests and transmit one or more responses as further discussed in at least FIGS. 3A-3C, 4A-4B, and 5A-5B.

In an example embodiment, the one or more analytics execution prediction applications 114 may be generally configured to generate prediction model training information and prediction model validation information, which may be used to further generate one or more execution prediction models. Additionally, the one or more analytics execution prediction applications 114 may also be generally configured to generate one or more predicted execution schedules based at least on the one or more prediction models based at least on one or more requests (e.g., predicted execution schedule request).

In an example embodiment, the data analytics prediction manager 112 may also be configured to provision one or more data analytics execution prediction applications 114 stored in the analytic execution prediction datastore 126-4 to the one or more virtual machines 210 for execution. In an example embodiment, the data analytics prediction manager 112 may be provisioned on an on-demand basis and/or periodic basis.

For example, and in response to a model generation request received from a client device (e.g., client device 130-1), the data analytics prediction manager 112 may be configured to provision the one or more data analytic execution prediction applications 114 and request the execution of the provisioned one or more data analytic execution prediction applications 114. The provisioned and executed data analytic execution prediction application 114 may then generate one or more execution prediction models. After the model is generated, then the data analytics prediction manager 112 may terminate the data analytic execution prediction application 114.

In an example embodiment and to ensure there are adequate computing resources allocated during provisioning of one or more data analytic execution prediction applications 114, the data analytics prediction manager 112 may be further configured to transmit one or more virtual machine (VM) provisioning request to the scalable computing system 104 (e.g., VM manager 284). In response, the scalable computing system 104 may provision one or more virtual machines 210 based at least on a number of available virtual machines to execute the one or more data analytic execution prediction applications 114.

Figure 2D:
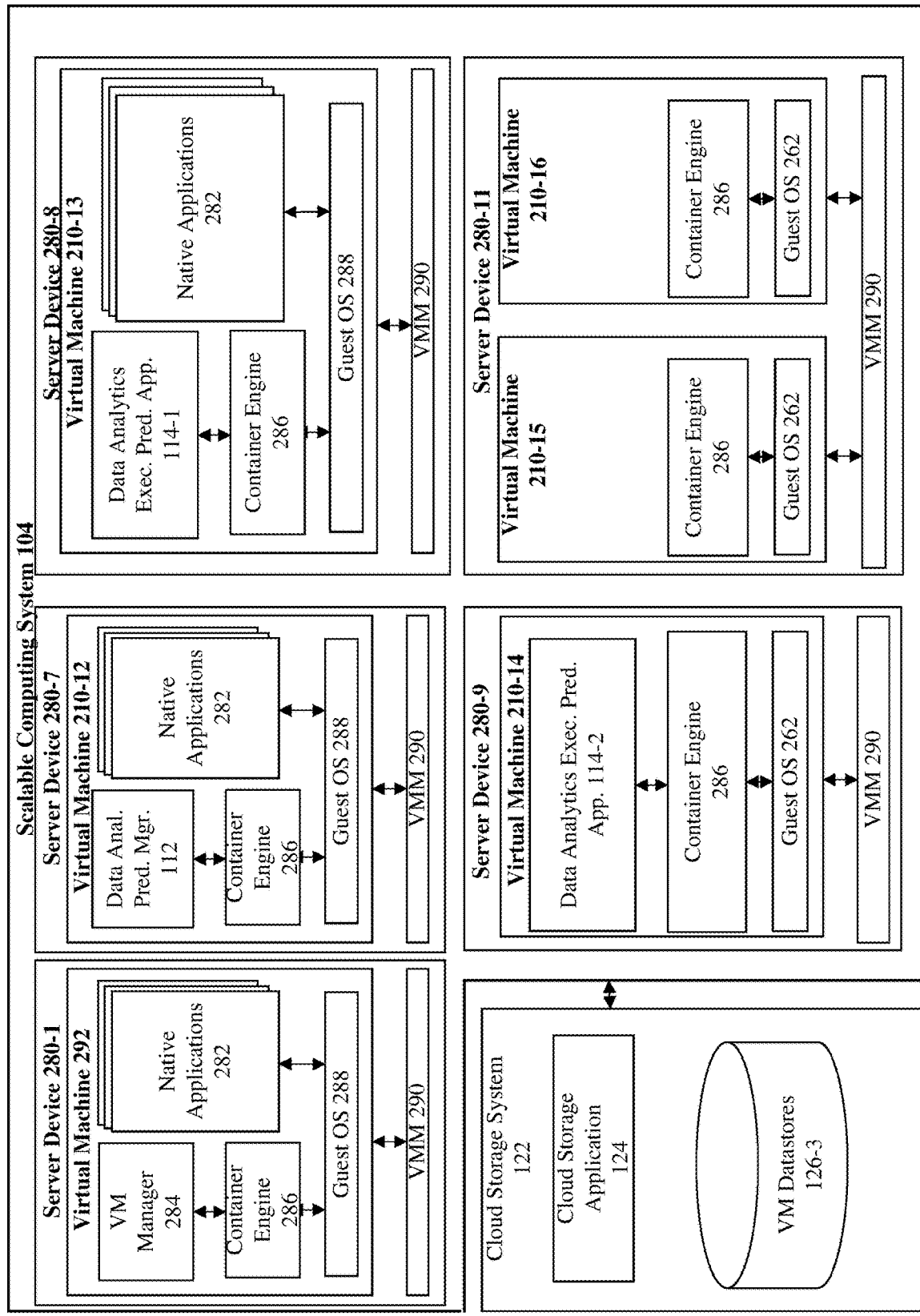
FIG. 2D illustrates server devices and virtual machines of a scalable computing system hosting or otherwise the data analytics execution prediction system according to an example embodiment.

FIG. 2D illustrates server devices 280 of the scalable computing system 104 configured to host one or more virtual machines 292 and 210 according to an example embodiment. It is to be appreciated that because the scalable computing system 104 has been discussed with respect to FIG. 2B, the following discussion will be focused primarily on any differences not discussed in FIG. 2B.

As previously illustrated and discussed in FIG. 2B, the scalable computing system 104 may be include a plurality of server devices 280 executing virtual machines 292 and 210. Also as previously illustrated and discussed in FIG. 2B, the virtual machines 210 may be further configured to execute container engines 286. The container engines 286 may be configured to execute the data analytics prediction manager 112 as a container application. Additionally, the native applications 282 may also be configured to assist in the execution of the data analytics prediction manager 112. In an example embodiment, the container engines 286 may also be configured to execute one or more data analytics execution prediction applications 234 as one or more container applications.

FIG. 3A illustrates example interactions between various components, applications, and systems for generating a execution prediction model based at least on past data analytics application executions using machine learning techniques according to an example embodiment.

In an example embodiment, the analytics execution prediction datastores 126-4 may be configured to store prediction model training information 320, prediction model validation information 322, and execution prediction model information 324. In an example embodiment, prediction model training information 320 may be representative of machine learning training dataset that may be used to train one or more execution prediction models. An example of the prediction model training information 320 is further illustrated and discussed with respect to FIG. 3C. In an example embodiment, the prediction model validation information 322 may be representative of validation dataset used to validate the trained one or more execution prediction models. In an example embodiment, the execution prediction model information 324 may be representative of the one or more execution prediction models.

In an example embodiment the client datastores 126-2 may be further configured to store source audit information 340, target audit information 342, source information 312-a, and target information 316-b. In an example embodiment, the source information 312-a may generally include various information that may be analyzed and processed (e.g., ETL operations, MapReduce operations, etc.) by the one or more data analytics applications 108. For example, the source information 312-a may represent data containers containing combinations of various information. The various information may include, without limitation, financial information, sales information, insurance information, personal information, demographics information, scientific information, and/or the like. Although not illustrated, the source information 312-a may be structured or otherwise formatted as a database including one or more tables. In an example embodiment, the target information 316-b may generally include various information that are output or generated by the one or more data analytics applications 108 after the source information 312-b has been analyzed and processed.

In an example embodiment, the source audit information 340 may generally include a history or log of one or more operations (e.g., ETL operations, MapReduce operations, etc.) that were performed by one or more applications (e.g., client applications executing on client devices 130, etc.) to generate or modify the source information 312-*a*. Thus, when source information 312-*a* and 312-*b* are modified or updated (e.g., modified or updated on a periodic basis, seemingly random basis, etc.) by an application, a record of that modification or update may be stored in the source audit information 340.

Similarly, target audit information 342 may generally include a history or log of one or more operations (e.g., ETL operations, MapReduce operations, etc.) that are performed by the one or more data analytics applications 108 using the source information 312-*a* to generate or modify the target information 316-*b*. It can be appreciated that while source audit information 340 and target audit information 342 are illustrated as separate information, in actual implementation, these may represent the same set of information, e.g., audit information that includes both source audit information 340 and target audit information 342. While not illustrated, it can be appreciated that both source audit information 340 and target audit information 342 may also be stored in the same data container, e.g., an audit data container.

For example, source information 312-1 may represent a financial records table in a financial records datastore configured to store financial information for customers, which may include one or more financial records for a first set of customers. Continuing with the example, each financial record may include, without limitation, a name of a customer, an unique customer identifier associated with the customer (e.g., social security number, tax identification number, etc.), corresponding annual income of the customer, corresponding amount of liquid assets of the customer, and/or other financial information associated with the customer.

Continuing with the above example, source information 312-2 may represent a demographic records table in a demographics records datastore configured to store demographic information for customers, which may include one or more demographic records for a second set of consumers that may at least partially overlap with the first set of customers. Continuing with the sample, each demographic record may include, without limitation, a name of a customer, an unique customer identifier associated with the customer (e.g., social security number, tax identification number, etc.), corresponding mailing address, corresponding race of the customer, corresponding gender of the customer, and/or other demographics information associated with the customer.

Continuing with the above example and assuming that the data analytics application 108-1 is configured to perform ETL operations on the source information 312-1 and 312-2, then the target information 316-1 may represent a combined records table that may include information extracted and transformed from both source information 312-1 and 312-2 and loaded into client datastores 126-2. Moreover, the combined records table may include, without limitation, one or more combined records, each combined record may identify a name of a customer, an unique identifier associated with the customer (e.g., phone number, social security number, tax identification number, etc.), corresponding annual income of the customer, corresponding gender of the customer, and/or other information extracted transformed from both source information 312-1 and 312-2. The above examples are not limited in this context.

In an example embodiment, source audit information 340 and target audit information 342 may generally include a history or log of one or more operations (e.g., ETL operations, etc.) that were performed by an application to generate the source information 312-*a* and/or the target information 312-*b*. Additionally, while source audit information 340 and target audit information 342 are illustrated as separate components or concepts, in actual implementation, these may represent the same set of information, i.e., audit information (e.g., audit information 352 of FIG. 3B) which may include both source audit information 340 and target audit information 342. Additionally, it can be appreciated that both source audit information 340 and target audit information 342 may be stored in the same data container, e.g., an audit data container. An example of the audit information is further illustrated discussed with respect to FIG. 3B.

In an example embodiment and as discussed with respect to FIGS. 2A-2B, a data analytics application 108-1 may include a computing cluster, which further includes master node 206 and slave nodes 208-1 and 208-2. In an example embodiment, the data analytics application 108-1 may be generally configured to perform analysis and processing source audit information 340 and source information 312-*a* and generate target audit information 342, and target information 316-*b*. In an example embodiment and as also discussed with respect to FIGS. 2A-2B, the data analytics execution manager 140-1 may be further configured to initiate the execution of the application data analytics application 108-1 periodically (e.g., every 30 minutes, every hour, etc.) or in accordance with a schedule further discussed with respect to FIGS. 4A-4B.

In an example embodiment, each data analytics execution prediction application, e.g., data analytics execution prediction application 114-1 may further include, without limitation, execution prediction model generation component 330 and audit information processing component 332. In an example embodiment, audit information processing component 332 may be generally configured to process (e.g., extract, format, transform, modify, and store, etc.) the audit information (e.g., source audit information 340 and target audit information 342) and generate prediction model training information 320 and prediction model validation information 322.

In an example embodiment, the prediction model generation component 330 may be generally configured to generate execution prediction model information 324 based at least on the generated prediction model training information 320. The execution prediction model information 324 may represent one or more execution prediction models, which may be used to predict when (e.g., date and time periods) one or more data analytics applications should be and should not be executed throughout a given time period (e.g., a day). Each of the one or more execution prediction models may correspond to at least a target information identifier (e.g., a unique alphanumeric identifier, etc.) that may identify target information (e.g., a table in a datastore, etc.) that was generated or modified based at least on the analysis and processing performed by an application (e.g., data analytics application 108-1).

Depending on the implementation and relevant features, the execution prediction model generation component 330 may be configured to execute one or more machine learning algorithms to train the one or more execution prediction models. The one or more machine learning models and associated machine learning algorithms may include, without limitation, decision tree classification algorithms, linear support vector classification algorithms, K-nearest neighbor classification algorithms, Naïve Bayes classification algorithms, Stochastic gradient descent classification algorithms, Kernel approximation algorithms and/or other machine learning algorithms.

For example, an execution prediction model, which may be a decision tree classification model that correspond to target information 316-1, may be trained to predict that the execution of the data analytics application 108-1 on a future day and time period (would likely result in the data analytics application 108-1 performing at least one operation to generate or modify the target information 316-1. As such, the execution prediction model may indicate in a predicted execution schedule that the data analytics application 108-1 on that future day and time period (e.g., Monday, Dec. 2, 2019, between hours 9 and 10 EST, etc.) should be executed.

In contrast and continuing with the above example, the execution prediction model corresponding to the target information 316-1 may be trained to predict that the execution of the data analytics application 108-1 on the same future day but different time period (e.g., Monday, Dec. 2, 2019, between hours 8 and 9 EST, etc.) would likely result in the data analytics application 108-1 not performing any operations. As such, the execution prediction model may indicate in the predicted execution schedule that the data analytics application 108-1 on the same future day but different time period (e.g., Monday, Dec. 2, 2019, between hours eight (8) and nine (9) EST, etc.) should not be executed.

In an example embodiment, predictions made by the generated one or more machine learning models may also be validated against the prediction model validation information 322 to provide associated confidence scores. It can be appreciated by accurately predicting when the one or more data analytics applications should be or should not be executed throughout a given day, the one or more machine learning models may increase efficiency at which the one or more data analytics application 108 may use the underlying computing resources (e.g., virtual machines, server devices, etc.). For example, allocate and use underlying computing resources only when the execution of the one or more data analytics application 108 would result performing at least one operation to generate or modify associated target information.

The operations of the various managers, applications, systems, and datastores will now be further discussed with reference to example operations as illustrated in FIG. 3A. Specifically, in a first example operation, the data analytics execution manager 140-1 may initiate one or more executions of the data analytics application 108-1 to: (1) analyze or process source information 312-a and source audit information 340; and (2) generate or modify target information 316-b and target audit information 342. In a second example operation, the data analytics prediction manager 112 may request the data analytics execution prediction application 114-1 to: (1) analyze and process source audit information 340 and target audit information 342 to generate or modify prediction model training information 320 and prediction model validation information 322; and (2) generate or modify the execution prediction model information 324 based at least on the prediction model training information 320 and prediction model validation information 322.

The first example operation may begin at stage 310-1, where the data analytics execution manager 140-1 may, periodically or in accordance with a schedule, request the data analytics application 108-1 to: (1) perform analysis and processing (e.g., ETL operations, etc.) on source information 312-1 (e.g., financial records table, etc.) and source information 312-2 (e.g., demographics records table, etc.); and (2) generate or modify target information 316-1 (e.g., a combined records table, etc.). In response to the request and at stage 310-2, the data analytics application 108-1 may perform the requested analysis and processing of the source information 312-1 and 312-2 using a computing cluster comprising a master node 206 and slave nodes 208-1 and 208-2. Additionally, the data analytics application 108-1 may also analyze to the source audit information 340 to determine whether source information 312-1 and 312-2 has been modified since last execution of the data analytics application 108-1 so that the data analytics application 108-1 may perform at least one operation to generate or modify the target information 316-1.

Continuing with the above example operation and at stage 310-3, the data analytics application 108-1 may generate or modify the target information 316 based at least on the analysis and processing of the source information 312-1 and 312-2. Additionally, the data analytics application 108-1 may also modify the target audit information 342 to add one or more new audit entries that indicate at least a number of operations performed by the data analytics application 108-1 to generate or modify the target information 316-1. At stage 310-4, the data analytics application 108-1 may then notify the data analytics execution manager 140-1 regarding the completion of the analysis and processing of the source information 312-1 and 312-2 to generate the target information 316-1 and target audit information 342.

It can be appreciated the data analytics execution manager 140-1 may initiate the execution of the data analytics application 108-1 on a periodic basis or in accordance to with schedule so that stages 310-1 through 310-4 may be repeatedly executed. It can be further appreciated that by repeatedly executing stages 310-1 through 310-4 throughout a given time period (e.g., a day), periodic or random modifications or updates to the source information 312-1 and 312-2 may be continuously analyzed and processed by the data analytics application 108-1 during substantially the same given time period. Additionally, by executing the data analytics application 108-1 for longer time periods (e.g., every day for a week, a month, or a year, etc.), the audit information (e.g., source audit information 340 and target audit information 342) may also include history or log information associated with the execution of the data analytics application 108-1 for a substantial period of time, e.g., one or more days (Monday through Friday) of 52 weeks in a given year.

The second example operation may begin at stage 312-1 where the data analytics prediction manager 112 may request the audit information processing component 332 to analyze and process processed (e.g., extracted, formatted, transformed, modified, and stored, etc.) the audit information, e.g., source audit information 340 and target audit information 342. And while not illustrated, it can be appreciated that the data analytics prediction manager 112 may generate the request, in response to one or more requests received from one or more client applications (not shown) executing on client devices 130 to generate execution prediction model information 324 based at least on the source audit information 340 and target audit information 342. Additionally or alternatively, the data analytics prediction manager 112 may also generate the request on a periodic basis so that the execution prediction model information 324 may be generated or modified as new source audit information 340 and target audit information 342 are generated and/or modified.

In response to the request and at stage 312-2, the audit information processing component 332 may perform the requested analysis and processing of the source audit information 340 and target audit information to generate or modify the prediction model training information 320 and prediction model validation information 322. Example operations that may be performed by the audit information processing component 332 to generate at least the prediction model training information 324 based at least on the source audit information 340 and target audit information 342 is further illustrated and discussed with respect to FIGS. 3B-3C.

At stage 312-3 the execution prediction model generation component 330 may train one or more execution prediction models represented as execution prediction model information 324 using one or more machine learning algorithms (e.g., decision tree classification algorithms, etc.) based at least on the prediction model training information 324. Additionally, the execution prediction model generation component 330 may also validate the one or more execution prediction models using the prediction model validation information 322. At stage 312-4, the execution prediction model generation component 330 may then generate the one or more execution prediction models represented as the execution prediction model information 324.

FIG. 3B illustrates an example embodiment of audit information 352, e.g., source audit information 340 and target audit information 342 that may be used to generate prediction model training information and prediction model validation information according to an example embodiment. As illustrated in the example embodiment of FIG. 3B of the audit information 352, e.g., source audit information 340 and 342, the audit information 352 may include one or more audit entries, where each audit entry may include one or more audit attributes.

In an example embodiment, the one or more audit attributes may include, without limitation, an entry audit attribute that uniquely identifies an audit entry in the audit information 352. The one or more audit attributes may also include a source information audit attribute that includes one or more source information identifiers, where each source information identifier (e.g., a unique alphanumeric identifier, etc.) may identify source information (e.g., a table in a datastore, etc.) that was analyzed or processed by an application (e.g., data analytics application 108-1).

The one or more audit attributes may further include a target information audit attribute that includes one or more target information identifiers, where each target information identifier (e.g., a unique alphanumeric identifier, etc.) may identify target information (e.g., a table in a datastore, etc.) that was generated or modified based at least on the analysis and processing performed by the application (e.g., data analytics application 108-1). The one or more audit attributes may still further include a starting timestamp audit attribute identifying date and time the application began its analysis and processing, an ending timestamp audit attribute identifying time and date the application completed its analysis and processing and generated corresponding target information, and operations audit attribute identifying a number of operations (e.g., records added in a table, etc.) that were performed to generate or modify the corresponding target information identified by the corresponding target information audit attribute.

It can be appreciated that while not illustrated, each audit entry may also include additional audit attributes depending on implementation. For example, each audit entry may include source information type audit attribute identifying the type of information (e.g., financial records, insurance records, demographics records, etc.) associated with each source information identifier of the source information audit attribute. Additionally, each audit entry may further include datastore audit attribute identifying one or more datastores each of source information and target information is stored in. Furthermore, each audit entry may include publication timestamp audit attribute identifying time and date the associated audit entry was created. The examples are limited in this context.

FIG. 3C illustrates an example embodiment of prediction model training information 320 that may be generated based at least on the source audit information 340 and the target audit information 342 according to an example embodiment. It can be appreciated that while the example embodiment of prediction model training information 320 of FIG. 3C substantially focuses on target information 316-1 that was generated or modified by the execution of data analytics application 108-1, such focus is only for purposes of explanation and not limitation.

As illustrated in the example embodiment of FIG. 3C, the prediction model training information 320 may be associated with target information 316-*b* (e.g., target information 316-1, etc.) and may include one or more training entries. Each training entry may include one or more training attributes which are generated based at least on the one or more audit entries of the audit information 352. It can be appreciated that the one or more training attributes may also be identified as a set of feature vectors that are used to train one or more machine learning execution prediction models.

In an example embodiment, the one or more training attributes may include, without limitation, an information training attribute that includes one or more target information identifiers (e.g., a unique alphanumeric identifier that identifies a table in a datastore, etc.) as previously discussed with respect to FIG. 3B. The one or more training attributes may also include an ending year training attribute identifying a year, a ending month training attribute identifying a month out of the year, an ending month day training attribute identifying a day out of the month, and an ending week day training attribute identifying a day out of a week (e.g., 1 for Monday, 2 for Tuesday, 3 for Wednesday, and so forth), and an ending hour training attribute identifying an hour out of 24 hours in an ending day for a particular time zone.

The one or more training attributes may further include operations training attribute identifying a number of operations (e.g., records added or transferred in a table, etc.) that were performed to generate or modify the target information identified by the corresponding target information training attribute. The one or more training attributes may still further include a classification training attribute that is derived based on the operations training attribute. For example, when the operations training attribute exceeds an operations threshold value (e.g., "0", "100", "150", etc.) then the classification training attribute may be assigned a classification value (e.g., "1"). Otherwise, the classification training attribute may be assigned a default classification value (e.g., "0").

To generate the prediction model training information 320, the audit information processing component 332 may be configured to analyze each audit entry in the audit information 352 and generate a corresponding entry in the prediction model training information 320. For example, with respect to the first audit entry in the audit information 352 of FIG. 3B, the audit information processing component 332 may be configured to generate a corresponding training entry in the prediction model training information 320.

Moreover, to generate the target information training attribute, the audit information processing component 332 may be configured to extract the target information audit attribute from the first audit entry.

Continuing with the above example and to generate the ending year, ending month, and ending month day training attributes, the audit information processing component 332 may be configured to extract the year (e.g., "2019"), the month (e.g., "12"), and the day (e.g., "2") from the ending timestamp audit attribute of the first audit entry. To generate the ending week day training attribute, the audit information processing component 332 may be configured to use the previously extracted year, month and day, to determine the day of the week (e.g., 1 (Monday), etc.). To generate the ending hour training attribute, the audit information processing component 332 may be configured to extract the hour (e.g., "8") from the ending timestamp audit attribute from the first audit entry and then add one hour to the extracted hour (e.g., "9").

Continuing with the above example and to generate the operations training attribute, the audit information processing component 332 may be configured extract the operations audit attribute (e.g., "125") from the first audit entry. To generate the classification training attribute, the audit information processing component 332 may compare the extracted operations training attribute to a data analytics operations threshold value and determine whether the extracted operations training attribute exceeds the data analytics operations threshold value. If extracted operations training attribute exceeds the data analytics operations threshold value, then the classification training attribute may be assigned a classification value that indicates the data analytics application should be executed (e.g., "1"). Otherwise, the classification training attribute may be assigned a default classification value that indicates the data analytics application should not be executed (e.g., "0").

Additionally, to ensure that the prediction model training information 320 includes information for all time periods (e.g., hour) in a day for a particular target information identified by the information training attribute (e.g., target information 316-1), the audit information processing component 332 may be further configured to generate one or more default training entries for that identified target information (e.g., default training entries 354-1, 354-2, etc.). Moreover, the audit information processing component 332 may generate one or more default training entries for any time periods (e.g., hours in one or more ending month days) that do not have a corresponding audit entry. The generated default training entries may also identify the particular target information (e.g., target information 316-1) and fill any time period gaps (e.g., ending hours "1" through "8"). Additionally, the default training entries may also set the operations training attribute and classification training attribute to their default values (e.g., "0").

It can be appreciated that by generating one or more default training entries in the prediction model training information 320 for that identified target information, the execution prediction model generation component 332 may not only train one or more execution prediction models to predict when a data analytics application should be executed throughout a given time period (e.g., 24 hours in a day), but also when the data analytics application should not be executed throughout the given time period.

Figure 4A:
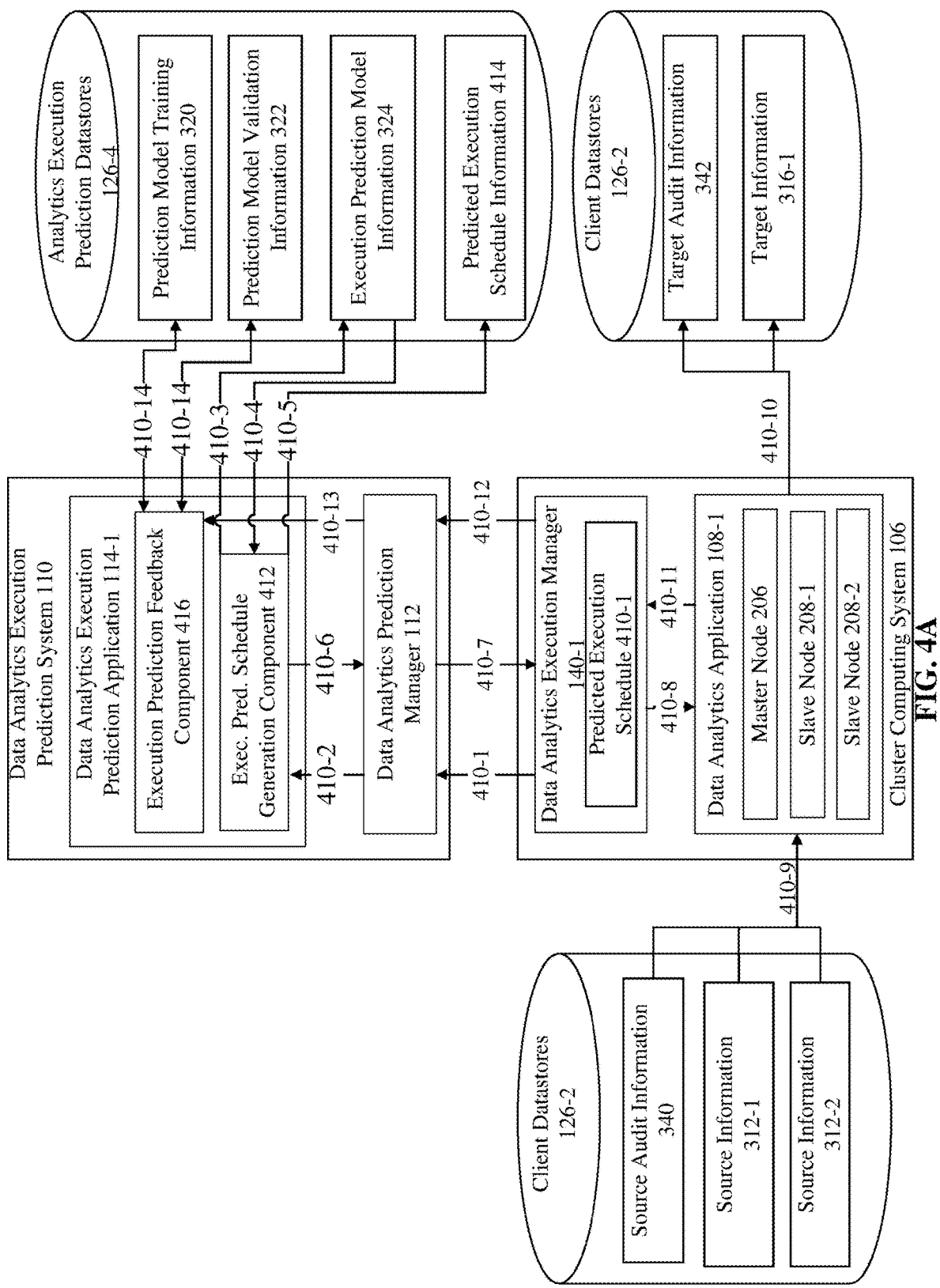
FIG. 4A illustrates example interactions between various components, applications, and systems for executing a data analytics application in accordance to a predicted execution schedule generated based on execution prediction model information according to an example embodiment.

FIG. 4A illustrates example interactions between various managers, applications, datastores, and systems for executing a data analytics application in accordance to a predicted execution schedule generated based at least on execution prediction model information according to an example embodiment. It is to be appreciated that because the various managers, applications, datastores and systems have been discussed with respect to FIGS. 3A-3B, the following discussion will be focused primarily on any differences not discussed in FIGS. 3A-3B.

In an example embodiment, the analytics execution prediction datastores 126-4 may be further configured to store predicted execution schedule information 414 representative of one or more predicted execution schedules generated based at least on the execution prediction model information 324. In an example embodiment, a data analytics execution prediction application, e.g., the data analytics execution prediction application 114-1 may further include an execution prediction schedule generation component 412 and execution prediction feedback component 416. In an example embodiment, the execution prediction schedule generation component 412 may be generally configured to generate a predicted execution schedule based at least on the execution prediction model information 324. In an example embodiment, the execution prediction feedback component 416 may be generally configured to received updated predicted execution schedules and update the predicted model training information 320 and/or predicted model validation information 322 based at least on the updated predicted execution schedules.

The operations of the various managers, applications, systems, and datastores will now be further discussed with reference to an example operation as illustrated in FIG. 4A. Specifically, in the example operation, the data analytics execution manager 140-1 requests a prediction execution schedule for a given day of a week with respect to corresponding target information 316-1 and requests the execution of the data analytics application 108-1 in accordance with the predicted execution schedule.

The example operation may begin at stage 410-1 where the data analytics execution manager 140-1 may generate a predicted execution schedule request for target information 316-1 having an associated target information identifier and execution manager timestamp identifying the current date and time as determined by the data analytics execution manger 140-1. The data analytics execution manager 140-1 may then transmit the predicted execution schedule request to the data analytics prediction manager 112. In response and at stage 410-2, the data analytics execution manager 140-1 may request the execution prediction schedule generation component 412 to generate a predicted execution schedule represented as predicted execution schedule information 414 for the target information having an associated target information identifier. Additionally, the request transmitted to the execution prediction schedule generation component 412 may also include execution manager timestamp to request the data analytics prediction manager 112 to provide a prediction execution schedule for a particular day of week as indicated by the execution manager timestamp (e.g., Monday).

In response and at stage 410-3, the execution prediction schedule generation component 412 may request, from the analytics execution prediction datastores 126-4, a previously generated execution prediction model for target information 316-1. In response and at stage 410-4, the execution prediction schedule generation component 412 may receive, from the analytics execution prediction datastores 126-4, the previously generated execution prediction model corresponding to the target information 316-1. At stage 410-5, the execution prediction schedule generation component 412 may generate the predicted execution schedule represented as predicted execution schedule information 414 for target information 316-1 by using at least the previously generated execution prediction model and a day of a week as indicated by the execution manager timestamp. An example embodiment of the generated predicted execution schedule is further illustrated and discussed with respect to FIG. 3C.

At stage 410-6, the execution prediction schedule generation component 412 may transmit the generated predicted execution schedule to the data analytics prediction manager 112. In response at stage 410-7, the data analytics prediction manager 112 may generate and transmit a predicted execution schedule response to the data analytics execution manager 140-1, where the predicted execution schedule response may include at least the generated predicted execution schedule. The data analytics execution manager 140-1 may then receive and store the predicted execution schedule 410-1 in at least local memory of virtual machine 210-12.

At stage 410-8, the data analytics execution manager 140-1 may generate and transmit a data analytics application execution request to the data analytics application 108-1 in accordance with the predicted execution schedule, where the analytics application execution request may include the source information 312-1 and 312-2 identifiers and target information 316-1 identifier corresponding to the predicted execution schedule. In response and at stage 410-9, the data analytics application 108-1 may analyze and process the source audit information 340, source information 312-1 and 312-2 as previously discussed with respect to at least FIG. 3A. Based on the analysis and processing and at stage 410-10, the data analytics application 108-1 may generate or modify target audit information 342 and target information 316-1 as previously discussed with respect to at least FIG. 3A.

At stage 410-11, the data analytics application 108-1 may generate and transmit a data analytics application execution response to the data analytics execution manager 140-1, where the response may include a number of data analytics operations that were actually performed by the data analytics application 108-1. In response, the data analytic execution manager 140-1 may determine whether the number of data analytics operations performed by the data analytics application 108-1 is consistent with execution prediction provided in the predicted execution schedule. If they are inconsistent, the data analytic execution manager 140-1 may update the predicted execution schedule for a particular hour.

For example, to determine whether the execution prediction in the prediction execution schedule is consistent with the result of the actual execution of data analytics application 108-1, the data analytics execution manager 140-1 may determine whether the number of data analytics operations exceeds the data analytics operations threshold value previously discussed with respect to FIG. 3C. If the number of data analytics operations exceeds the data analytics operations threshold value, then the data analytics execution manager 140-1 may store an execution feedback value that indicates the data analytics application 108-1 should have been executed (e.g., "1"). Otherwise, the data analytics execution manager 140-1 may store an execution feedback value that indicates the data analytics application 108-1 should not have been executed (e.g., "0"). This execution feedback value may then be compared to the execution prediction to determine whether they are consistent (e.g., substantially equal) or inconsistent (e.g., different).

It can be appreciated that stages 410-8 through 410-11 as discussed above may be repeated in accordance with the predicted execution schedule until the end of a given time period (e.g., end of a day (24 hours), end of two days (48 hours), end of a week, etc.) or end of the predicted execution schedule has been reached. At stage 410-12 and after reaching the end of a given time period (e.g., end of a day (24 hours), end of two days (48 hours), end of a week, etc.) or the end of the predicted execution schedule, the data analytics execution manager 140-1 may generate and transmit a schedule feedback update request to the data analytics prediction manager 112, where the schedule feedback update request may include an updated predicted execution schedule, and the year, month, and day of the month of the predicted execution schedule. The schedule feedback update request may be configured to request the data analytics prediction manager 112 to update execution prediction model training information 320 and/or prediction model validation information 322. Additional example operations between at least the data analytics execution manager 140-1, the data analytics prediction manager 112, and the data analytics application 108-1 are further discussed with respect to FIGS. 5A-5B.

In response at stage 410-13, the data analytics prediction manager 112 may request the execution prediction feedback component 416 to modify the prediction model training information 320 and/or prediction model validation information 322 based at least on the updated predicted execution schedule. At stage 410-14, the execution prediction feedback component 416 may modify the prediction model training information 320 and/or prediction model validation information 322 based at least on the updated predicted execution schedule.

FIG. 4B illustrates an example embodiment of a predicted execution schedule 410-1 that may be generated according to an example embodiment. Moreover, the predicted execution schedule 410-1 may be generated for a particular day of a week (e.g., a Monday) which is determined by the execution manager timestamp transmitted to the data analytics prediction manager 112. It can be appreciated that while the example embodiment of predicted execution schedule of FIG. 4B substantially focuses on the predicted execution schedule for generating or modifying target information 316-1, such focus is only for purposes of explanation and not limitation.

As illustrated in the example embodiment of FIG. 4B, the predicted execution schedule 410-1 corresponding to target information 316-1 may include one or more prediction entries. Each prediction entry may include one or more prediction attributes which were generated by corresponding execution prediction model and validated by the prediction model validation information 322.

In an example embodiment, the one or more prediction attributes may include, without limitation, a, information prediction attribute that may include one or more target information identifiers (e.g., a unique alphanumeric identifier that identifies a table in a datastore, etc.) as previously discussed with respect to FIGS. 3B-3C. The one or more predicted execution attributes may also include an hour prediction attribute identifying a specific hour out of a day the corresponding execution prediction is intended to predict, a confidence score prediction attribute identifying an estimated probability that the corresponding execution prediction would be accurate, an execution prediction attribute identifying whether the data analytics application should be executed (e.g., "1") or not (e.g., "0") for the corresponding hour indicated in the hour prediction attribute, and a default execution prediction attribute identify whether the data analytics application should be executed (e.g., "1") or not executed (e.g., "0") regardless of the corresponding confidence score.

To improve the accuracy of the execution predictions for one or more hours of a given day, each prediction entry may also include one or more feedback attributes. The one or more feedback attributes may include an execution feedback attribute and an operations feedback attribute. The execution feedback attribute be representative of what the actual value of the execution prediction attribute should have been in light of the result of execution of the data analytics application 108-1. The operations feedback attribute may be representative of the actual number of data analytics operations performed by the execution of the data analytics application 108-1.

To determine these feedback attributes, the data analytics execution manager 140-1 may first determine whether there is an inconsistency between the execution prediction and the actual number of operations performed by the execution of the data analytics application 108-1 as discussed at stage 410-11 of FIG. 4A. If the data analytics execution manager 140-1 determines that there is an inconsistency, then the data analytics execution manager 140-1 may assign the execution feedback attribute with the execution feedback value determined at stage 410-11 of FIG. 4A. Additionally, the data analytics execution manager 140-1 may also assign the operations feedback attribute with the number of data analytics operations received from the data analytics operation at stage 410-11 of FIG. 4A. If there is no inconsistency, then the execution feedback attribute and the operations feedback attribute may remain as their default values indicating that no updates have been made (e.g., "undefined," "Not a Number," "NaN," etc.).

For example, with respect to hour "9" in the predicted execution schedule, while the confidence score prediction attribute (e.g., "95") and execution prediction attribute (e.g., "1") indicate that the data analytics application 108-1 should be executed, the actual execution of the data analytics application 108-1 resulted in no data analytics operations as indicated in the corresponding operations feedback attribute (e.g., "0"). As such, the corresponding execution feedback attribute at hour "9" may be assigned an execution feedback value indicating that data analytics application 108-1 should not have been executed (e.g., "0") rather than executed as indicated by the execution prediction attribute (e.g., "1").

In another example with respect to hour "13" in the predicted execution schedule, while the confidence score prediction attribute (e.g., "68") and execution prediction attribute (e.g., "0") indicate that the data analytics application 108-1 should not be executed, it is nonetheless, executed based on the default prediction attribute (e.g., "1"). However, the actual execution of the data analytics application 108-1 resulted in one or more data analytics operations as indicated in the corresponding operations feedback attribute (e.g., "200"). As such, the corresponding execution feedback attribute at hour "13" may be assigned an execution feedback value indicating that data analytics application 108-1 should have been executed (e.g., "1") rather than not executed as indicated by the execution prediction attribute (e.g., "0").

FIGS. 5A-5B illustrate an example logic flow that may be performed by a data analytics execution manager (e.g., data analytics execution manager 140-1) for executing one or more data analytics applications according to a predicted execution schedule in an example embodiment.

The example logic flow may begin at stage 510, where the data analytics execution manager 140-1 may request a predicted execution schedule from the data analytics prediction manager 112 for a corresponding target information identifier as previously discussed with respect to at least stages 410-1 through 410-5 of FIG. 4A.

At stage 512, the data analytics execution manager 140-1 may be configured to receive and store the predicted execution schedule from the data analytics prediction manager 112 having the corresponding target information identifier as previously discussed with respect to stages 410-6 through 410-7 of FIG. 4A.

At stage 514, the data analytics execution manager 140-1 may set the next prediction entry based at least on current timestamp and predicted execution schedule. For example, the data analytics execution manager 140-1 may first determine a current execution manager timestamp (e.g., Monday at 8:30 EST) and then determine a prediction entry in the predicted execution schedule 410-1 that comes immediately after the current execution manager timestamp (e.g., prediction entry with hour "9" which comes immediately after 8:30). The data analytics execution manager 140-1 may then set the next prediction entry to be the prediction entry determined at stage 514.

At stage 516, the data analytics execution manager 140-1 may determine whether the current execution manager timestamp is greater than or equal to the start time period (e.g., hour "9") in the next prediction entry previously set at stage 514. For example and with reference to FIG. 4B, assuming that the current execution manager timestamp is 8:30 EST and the start time period for the next prediction entry is hour "9" then the data analytics execution manager 140-1 may determine that the current execution manager timestamp (8:30 EST) is not greater than or equal to the time period (hour "9") in the next prediction entry and the logic flow proceeds to stage 540. However, if the current execution manager timestamp is 9:00 EST, then the data analytics execution manager 140-1 may determine that the current execution manager timestamp (9:00 EST) is greater than or equal to the time period (hour "9") in the next prediction entry and the logic flow proceeds to stage 518.

Assuming that the logic flow proceeds to stage 540 from stage 516, then the data analytics execution manager 140-1 may wait until the start time period of the next prediction entry. For example and with reference to FIG. 4B, assuming that the current execution manager timestamp is 8:30 EST and the start time period for the next prediction entry is hour "9" then the data analytics execution manager 140-1 may wait, idle, or sleep until the start time period of hour "9." After waiting, idling, or sleeping for an appropriate amount of time, the data analytics execution manager 140-1 may wake and then proceed to stage 542.

Assuming that the logic flow proceeds to 542 from stage 540, the data analytics execution manager 140-1 may determine whether the execution manager timestamp is greater than or equal to end of day or end of predicted execution schedule. For example and with reference to FIG. 4B, assuming that the data analytics execution manager 140-1 determines that the current execution manager timestamp is Monday at 9:01 EST then the data analytics execution manager 140-1 may determine whether 9:01 EST is greater than or equal to the end of day (e.g., Monday at 23:59 EST or Tuesday at 0:00 EST, etc.). If the data analytics execution manager 140-1 determines that Monday 9:01 EST is not greater or equal to the end of day, then the logic flow proceeds back to stage 516. Otherwise, the logic flow proceeds to stage 548.

Additionally or alternatively, the data analytics execution manager 140-1 may determine whether the end of the predicted execution schedule has been reached based at least on whether the next prediction entry is empty (e.g., NULL, undefined, etc.). If the data analytics execution manager 140-1 determines that the next prediction entry is not empty then the logic flow proceeds to stage 516. Otherwise, the logic flow proceeds to 548.

Assuming that the logic flow proceeds to stage 518 from stage 516, the data analytics execution manager 140-1 may determine whether the confidence score as indicated in the confidence score prediction attribute for the next prediction entry is greater than or equal to a confidence score threshold. For example and with reference to FIG. 4B, if the current execution manager timestamp is 9:00 EST and the next prediction entry is hour "9", then the data analytics execution manager 140-1 may determine whether the confidence score of "95" as indicated by the confidence score prediction attribute is greater than or equal to a confidence score threshold (e.g., "90"). If the confidence score is greater than or equal to a confidence score threshold then the logic flow proceeds to stage 520. Otherwise, the logic flow proceeds to stage 546.

Assuming that the logic flow proceeds to stage 546, the data analytics execution manager 140-1 may determine whether the default execution as indicated in the execution default execution prediction attribute for the next prediction entry is greater than or equal to an execution threshold. For example and with reference to FIG. 4B, if the current execution manager timestamp is 13:00 EST and the next prediction entry is hour "13", then the data analytics execution manager 140-1 may determine whether the default execution of "1" as indicated in the default execution prediction attribute is greater than or equal to a execution threshold (e.g., "1"). If the default execution is greater than or equal to the execution threshold, then the logic then the logic flow proceeds to stage 522. In other words, even if it was determined at stage 518 that the confidence score is less than the confidence score threshold, the logic flow may still proceed to stage 522. Otherwise, the logic flow proceeds to stage 528.

Assuming instead that the logic flow proceeds to stage 520, the data analytics execution manager 140-1 may determine whether the execution prediction as indicated in the execution prediction attribute for the next prediction entry is greater than or equal to an execution threshold. For example and with reference to FIG. 4B, if the current execution manager timestamp is 9:00 EST and the next prediction entry is hour "9", then the data analytics execution manager 140-1 may determine whether the execution prediction of "1" as indicated in the execution prediction attribute is greater than or equal to a execution threshold (e.g., "1"). If the execution prediction is greater than or equal to the execution threshold, then the logic then the logic flow proceeds to stage 522. Otherwise the logic flow proceeds to stage 528.

Assuming that the logic flow proceeds to stage 522, the data analytics execution manager 140-1 may generate and transmit a data analytics application execution request to the data analytics application 108-1 to request the execution of the data analytics application as previously discussed with respect to at least stages 410-8 through 410-10 of FIG. 4A.

At stage 524, the data analytics execution manager 140-1 may receive a data analytics application execution response from the data analytics application 108-1 as previously discussed with respect to at least stages 410-11 of FIG. 4A.

At stage 526, the data analytics execution manager 140-1 may update the predicted execution schedule based at least on the received data analytics application execution response as discussed with respect to at least stages 410-11 of FIG. 4A and execution feedback attribute and operations feedback attribute of FIG. 4B.

At stage 528, the data analytics execution manager 140-1 may move or identify the next prediction entry in the predicted execution schedule. For example and with reference to FIG. 4B, assuming that the data analytics execution manager 140-1 determines that the current execution manager timestamp is Monday at 9:30 EST, then the data analytics execution manager 140-1 may determine a prediction entry in the predicted execution schedule 410-1 that comes immediately after the current execution manager timestamp, which is prediction entry with hour "10." The data analytics execution manager 140-1 may then set the next prediction entry to be the prediction entry determined at stage 528. In another example and with reference to FIG. 4B, and assuming that the data analytics execution manager 140-1 determines that the current execution manager timestamp is Monday at 13:00 EST, then the data analytics execution manager 140-1 may set the next prediction entry to be empty (e.g., NULL, undefined, etc.) because the example predicted execution schedule ends at hour "13." After completion of stage 528, the data analytics execution manager 140-1 may then proceed to stage 542 as previously discussed.

It can be appreciated that the stages 516 through 546 may be repeatedly performed until the current execution manager timestamp is greater or equal to the end of day and/or the data analytics execution manager 140-1 determines that the next prediction entry is empty. At such point, the logic flow proceeds to stage 548.

At stage 548, the data analytics execution manager 140-1 may generate and transmit to the data analytics prediction manager 112 a schedule feedback update request configured to request the modification of the prediction model training information and/or prediction model validation information based on the updated predicted execution schedule as discussed with respect to at least stages 410-12 through 410-14 of FIG. 4A.

Figure 6:
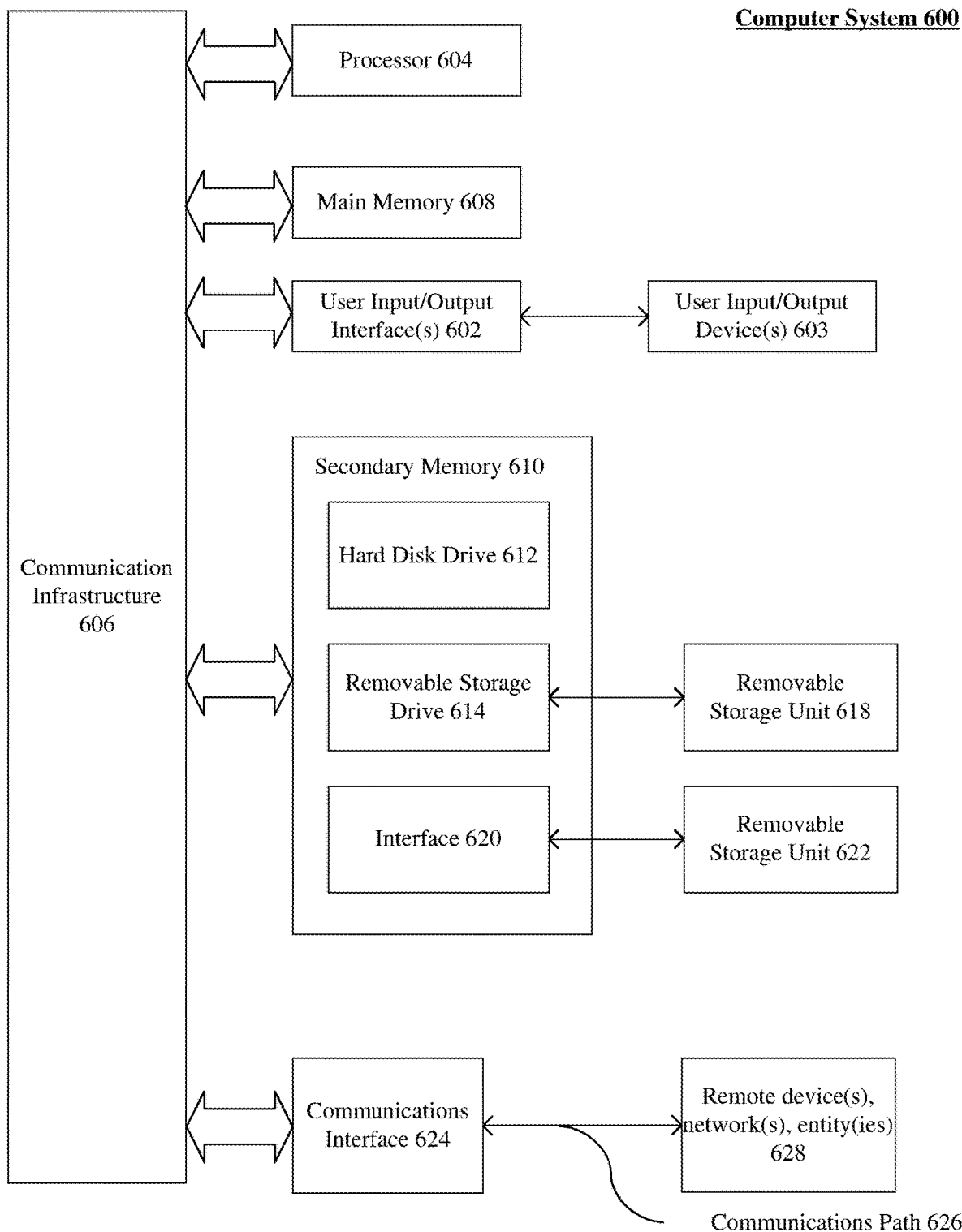
FIG. 6 illustrates an example computer system useful for implementing various embodiments of this disclosure.

FIG. 6 illustrates an example computer system 600 useful for implementing various embodiments of this disclosure. Moreover, various embodiments and components therein can be implemented, for example, using one or more well-known computer systems, such as, for example, the example embodiments, systems, and/or devices (e.g., server devices 280, cloud storage system 122, client devices 130, cloud monitoring system 118, etc.) shown in the figures or otherwise discussed. Computer system 600 can be any well-known computer capable of performing the functions described herein.

Computer system 600 includes one or more processors (also called central processing units, or CPUs), such as a processor 604. Processor 604 is connected to a communication infrastructure or bus 606.

One or more processors 604 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 also includes user input/output device(s) 603, such as monitors, keyboards, pointing devices, etc., that communicate with communication infrastructure or bus 606 through user input/output interface(s) 602.

Computer system 600 also includes a main or primary memory 608, such as random access memory (RAM). Main memory 608 may include one or more levels of cache. Main memory 608 has stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 includes a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 reads from and/or writes to removable storage unit 618 in a well-known manner.

According to an example embodiment, secondary memory 610 may include other means, instrumentalities or other approaches for allowing computer programs and/or other instructions and/or data to be accessed by computer system 600. Such means, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 enables computer system 600 to communicate and interact with any combination of remote devices, remote networks, remote entities, etc. (individually and collectively referenced by reference number 628). For example, communication interface 624 may allow computer system 600 to communicate with remote devices 628 over communications path 626, which may be wired and/or wireless, and which may include any combination of LANs, WANs, the Internet, etc. Control logic and/or data may be transmitted to and from computer system 600 via communications path 626.

In an embodiment, a non-transitory, tangible apparatus or article of manufacture comprising a non-transitory, tangible computer useable or readable medium having control logic (software) stored thereon is also referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments may operate with software, hardware, and/or operating system implementations other than those described herein.

It is to be appreciated that the Detailed Description section, and not the Summary and Abstract sections, is intended to be used to interpret the claims. The Summary and Abstract sections can set forth one or more but not all example embodiments as contemplated by the inventor, and thus, are not intended to limit this disclosure or the appended claims in any way.

While this disclosure describes example embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described example embodiments, but should be defined only in accordance with the following claims and their equivalents.

The invention claimed is:

1. At least one device, comprising:
    at least one processor; and
    a memory operatively coupled to the at least one processor, wherein the at least one processor is configured to perform operations comprising:
        requesting a prediction entry in a predicted execution schedule based at least on a current timestamp, wherein the predicted execution schedule is generated by an execution prediction model corresponding to target information of a data analytics application, the execution prediction model trained by at least audit information associated with at least one instance of execution of the data analytics application, transmitting a first data analytics application execution request configured to request a first instance of execution of the data analytics application based on a confidence score and an execution prediction of the prediction entry;

receiving a data analytics application execution response from the data analytics application, wherein the response includes a number of data analytics operations that were actually performed by the data analytics application; and determining that the execution prediction did not accurately predict that the first instance of execution of the data analytics application based at least on a determination of whether a number of data analytics operations that were actually performed exceeds a data analytics operations threshold.

2. The at least one device of claim 1, wherein, the data analytics application is configured to generate target information based at least on an analysis and processing of source information identified by a source information identifier, the data analytics application is further configured to update audit information with an audit entry associated with the first instance of execution of the data analytics application, the audit entry includes a source information audit attribute, a target information audit attribute, and/or a data analytics operations audit attribute, and the transmitting is based at least on a determination that a first confidence score is greater than or equal to a confidence score threshold and a determination that the execution prediction is greater than or equal to the data analytics operations threshold.

3. The at least one device of claim 1, wherein the at least one processor is further configured to perform the operations comprising:

transmitting a predicted execution schedule request for target information having an associated target information identifier to a data analytics prediction manager, receiving a predicted execution schedule response from the data analytics prediction manager, wherein the predicted execution schedule response includes the predicted execution schedule, and storing the received predicted execution schedule in at least a local memory of a virtual machine.

4. The at least one device of claim 3, wherein, the predicted execution schedule is associated with the target information identifier, the prediction model training information includes at least two training entries, and each training entry of the at least two training entries includes an information training attribute, an ending year training attribute, an ending month training attribute, an ending month day attribute, an ending week day training attribute, an ending hour training attribute, an operations training attribute, and a classification training attribute.

5. The at least one device of claim 3, wherein, the predicted execution schedule request includes a current timestamp as determined by the data analytics execution manager and the target information identifier, and the data analytics application is configured to generate the predicted execution schedule based at least on an execution prediction model associated with the target information identifier.

6. The at least one device of claim 3, wherein, the predicted execution schedule is configured to predict whether the data analytics application should be executed for at least two different time periods, and the predicted execution schedule includes at least two prediction entries corresponding to the at least two different time periods.

7. The at least one device of claim 6, wherein each prediction entry of the at least two prediction entries includes an information prediction attribute, an hour prediction attribute indicating a specific hour the prediction entry is to predict, an execution prediction attribute indicating whether the data analytics application should be executed during the specific hour, and a confidence score prediction attribute indicating a probability that the execution prediction is accurate.

8. The at least one device of claim 1, wherein the at least one processor is further configured to perform operations comprising:

updating at least an execution feedback attribute of a first prediction entry to indicate that the execution prediction did not accurately predict the first instance of execution of the data analytics application based at least on a determination that the number of data analytics operations that were actually performed did not exceed the data analytics operations threshold.

9. The at least one device of claim 1, wherein the at least one processor is further configured to perform operations comprising:

identifying a second prediction entry in the predicted execution schedule based at least on the current timestamp and a first prediction entry, and waiting until the current timestamp is greater than or equal to an hour prediction attribute of the second prediction entry.

10. The at least one device of claim 9, wherein the at least one processor is further configured to perform operations comprising:

determining that the current timestamp is greater than or equal to an end time period indicating an end time for execution of the data analytics application, and transmitting the predicted execution schedule to a data analytics prediction manager, wherein the transmitting is based at least on the determination that the current timestamp is greater than or equal to the end time period.

11. The at least one device of claim 9, wherein the at least one processor is further configured to perform operations comprising:

identifying a default execution that corresponds to the second prediction entry, wherein the identification is based at least on a determination that a second confidence score that corresponds to the second prediction entry is less than the confidence score threshold, and determining that the default execution of the second prediction entry is greater than or equal to an execution threshold.

12. The at least one device of claim 11, wherein the at least one processor is further configured to perform operations comprising:

transmitting a second data analytics application execution request configured to request a second instance of execution of the data analytics application, wherein the transmitting is based at least on the determination that the default execution associated with the second instance of execution of the data analytics application is greater than or equal to the execution threshold.

13. The at least one device of claim 11, wherein the processor is further configured to perform operations comprising:
   identifying a third prediction entry in the predicted execution schedule based at least on a determination that a default execution prediction attribute of the second prediction entry is less than the execution threshold, wherein the identification is based at least on the current timestamp.

14. A computer-implemented method, comprising:
   requesting, by a data analytics execution manager, a prediction entry in a predicted execution schedule based at least on a current timestamp, wherein the predicted execution schedule is generated by an execution prediction model corresponding to target information of a data analytics application, the execution prediction model trained by at least audit information associated with at least one instance of execution of the data analytics application;
   transmitting, by the data analytics execution manager, a first data analytics application execution request configured to request a first instance of execution of the data analytics application based on a confidence score and an execution prediction of the prediction entry;
   receiving, by the data analytics execution manager, a data analytics application execution response from the data analytics application, wherein the response includes a number of data analytics operations that were actually performed by the data analytics application, and
   determining, by the data analytics execution manager, that the execution prediction did not accurately predict the first instance of execution of the data analytics application based at least on a determination of whether a number of data analytics operations that were actually performed exceeds a data analytics operations threshold.

15. The computer-implemented method of claim 14, further comprising:
   transmitting, by the data analytics execution manager, a predicted execution schedule request for target information having an associated target information identifier to a data analytics prediction manager,
   receiving, by the data analytics execution manager, a predicted execution schedule response from the data analytics prediction manager, wherein the predicted execution schedule response includes the predicted execution schedule, and
   storing, by the data analytics execution manager, the received predicted execution schedule in at least local memory of a virtual machine executing the data analytics execution manager.

16. A tangible computer-readable device having instructions stored thereon that, when executed by at least one computing device, cause the at least one computing device to perform operations comprising:
   requesting, by a data analytics execution manager, a prediction entry in a predicted execution schedule based at least on a current timestamp, wherein the predicted execution schedule is generated by an execution prediction model corresponding to target information of a data analytics application, the execution prediction model trained by at least audit information associated with at least one instance of execution of the data analytics application;
   transmitting, by the data analytics execution manager, a first data analytics application execution request configured to request a first instance of execution of the data analytics application based on a confidence score and an execution prediction of the prediction entry;
   receiving, by the data analytics execution manager, a data analytics application execution response from the data analytics application, wherein the response includes a number of data analytics operations that were actually performed by the data analytics application, and
   determining, by the data analytics execution manager, that the execution prediction accurately predicted the first instance of execution of the data analytics application based at least on a determination of whether a number of data analytics operations that were actually performed exceeds a data analytics operations threshold.

17. The tangible computer-readable device of claim 16, wherein the operations further comprise:
   transmitting, by the data analytics execution manager, a predicted execution schedule request for target information having an associated target information identifier to a data analytics prediction manager,
   receiving, by the data analytics execution manager, a predicted execution schedule response from the data analytics prediction manager, wherein the predicted execution schedule response includes the predicted execution schedule, and
   storing, by the data analytics execution manager, the received predicted execution schedule in at least local memory of a virtual machine executing the operations of the data analytics execution manager.

* * * * *